(12) United States Patent
Miura et al.

(10) Patent No.: US 11,060,940 B2
(45) Date of Patent: Jul. 13, 2021

(54) VIBRATION INSULATOR AND UNBALANCE DETECTION DEVICE INCLUDING VIBRATION INSULATOR

(71) Applicant: MITSUBISHI HEAVY INDUSTRIES ENGINE & TURBOCHARGER, LTD., Sagamihara (JP)

(72) Inventors: Shuichi Miura, Tokyo (JP); Katsuya Yamashita, Tokyo (JP); Naoyuki Nagai, Tokyo (JP); Yosuke Dammoto, Sagamihara (JP); Shota Yoshikawa, Sagamihara (JP)

(73) Assignee: MITSUBISHI HEAVY INDUSTRIES ENGINE & TURBOCHARGER, LTD., Sagamihara (JP)

( * ) Notice: Subject to any disclaimer, the term of this patent is extended or adjusted under 35 U.S.C. 154(b) by 288 days.

(21) Appl. No.: 16/313,319

(22) PCT Filed: Nov. 30, 2017

(86) PCT No.: PCT/JP2017/043187
§ 371 (c)(1),
(2) Date: Dec. 26, 2018

(87) PCT Pub. No.: WO2018/105499
PCT Pub. Date: Jun. 14, 2018

(65) Prior Publication Data
US 2019/0162622 A1     May 30, 2019

(30) Foreign Application Priority Data
Dec. 7, 2016  (JP) .............................. JP2016-237649

(51) Int. Cl.
*G01M 1/16*     (2006.01)
*F16F 1/38*     (2006.01)
(Continued)

(52) U.S. Cl.
CPC ............. *G01M 1/16* (2013.01); *F16F 1/3732* (2013.01); *F16F 1/3842* (2013.01); *F16F 7/108* (2013.01); *F16F 15/04* (2013.01); *F16F 3/10* (2013.01)

(58) Field of Classification Search
CPC .. G01M 1/16; F16F 1/3732; F16F 3/10; F16F 15/10; F16F 15/1201; F16F 15/1214; F16F 15/12306
See application file for complete search history.

(56) References Cited

U.S. PATENT DOCUMENTS 1,209,730 A * 12/1916 LeBlanc ............... F16F 15/173
                                                          74/573.1
2,874,008 A    2/1959 Orte et al.
(Continued)

FOREIGN PATENT DOCUMENTS

CN    1109147 A    9/1995
CN    1353247 A    6/2002
(Continued)

OTHER PUBLICATIONS

Partial Supplementary European Search Report dated Jul. 22, 2019 in the corresponding European Application No. 17877700.9.
(Continued)

*Primary Examiner* — Melanie Torres Williams
(74) *Attorney, Agent, or Firm* — Birch, Stewart, Kolasch & Birch, LLP

(57) ABSTRACT

There is provided a vibration insulator mounted between a cartridge and a wheel-side housing, in which the cartridge includes a rotor having a wheel and a rotational shaft and a bearing housing accommodating a bearing rotatably supporting the rotor, and the wheel-side housing is to be pressed to the bearing housing in an axial direction. The vibration insulator includes an annular outer ring portion having a wheel-side contact surface configured to come into contact
(Continued)

with the wheel-side housing, an annular inner ring portion disposed inside the outer ring portion with a clearance from the outer ring portion and having a bearing-side contact surface configured to come into contact with the bearing housing, and a flexible support portion interposed between the outer ring portion and the inner ring portion and connecting the outer ring portion and the inner ring portion, the flexible support portion being elastically deformable.

19 Claims, 6 Drawing Sheets

(51) Int. Cl.

| | | |
|---|---|---|
| *F16F 7/108* | (2006.01) | |
| *F16F 1/373* | (2006.01) | |
| *F16F 15/04* | (2006.01) | |
| *F16F 3/10* | (2006.01) | |

(56) References Cited

U.S. PATENT DOCUMENTS

| | | | | |
|---|---|---|---|---|
| 3,837,178 | A | * | 9/1974 | Hackforth ............ F16D 3/76 464/89 |
| 3,887,024 | A | * | 6/1975 | Takahashi ............ F16D 3/387 180/381 |
| 4,325,259 | A | | 4/1982 | Willertz |
| 4,694,689 | A | | 9/1987 | Kawasaki |
| 4,864,859 | A | | 9/1989 | Jensen |
| 4,900,165 | A | | 2/1990 | Kun et al. |
| 5,102,694 | A | * | 4/1992 | Taylor ............ C23C 16/306 427/162 |
| 5,197,010 | A | | 3/1993 | Andersson |
| 5,531,642 | A | * | 7/1996 | Shiomi ............ F16D 3/68 464/74 |
| 5,901,616 | A | * | 5/1999 | Miner ............ B64C 27/001 416/145 |
| 6,170,989 | B1 | * | 1/2001 | Zeidan ............ F16C 17/03 384/117 |
| 6,171,192 | B1 | * | 1/2001 | Fukushima ......... F16F 15/1214 464/101 |
| 6,318,527 | B1 | * | 11/2001 | Byrnes ............ B64C 27/001 188/378 |
| 6,474,166 | B1 | | 11/2002 | Osawa et al. |
| 9,181,804 | B1 | | 11/2015 | Kennedy |
| 10,119,419 | B2 | | 11/2018 | Walter et al. |
| 2001/0010109 | A1 | * | 8/2001 | Jager ............ E05F 15/697 16/199 |
| 2001/0027688 | A1 | | 10/2001 | Yamanaka |
| 2002/0054821 | A1 | | 5/2002 | Takeuchi et al. |
| 2006/0107744 | A1 | | 5/2006 | Li et al. |
| 2008/0047344 | A1 | | 2/2008 | Gutknecht |
| 2008/0289416 | A1 | | 11/2008 | Thelen |
| 2009/0221376 | A1 | * | 9/2009 | Movlazada ......... F16F 15/12306 464/180 |
| 2009/0224447 | A1 | * | 9/2009 | Rodecker ............ F16F 1/3732 267/141.1 |
| 2009/0304313 | A1 | * | 12/2009 | Ertas ............ F16C 32/0603 384/99 |
| 2010/0191380 | A1 | | 7/2010 | Maeda |
| 2010/0269588 | A1 | | 10/2010 | Thelen et al. |
| 2012/0181734 | A1 | * | 7/2012 | Zeidan ............ F16C 17/03 267/140.11 |
| 2014/0007663 | A1 | | 1/2014 | Berger |
| 2014/0200837 | A1 | | 7/2014 | Blair et al. |
| 2014/0353102 | A1 | * | 12/2014 | Zeidan ............ F16C 17/03 188/380 |
| 2015/0185089 | A1 | | 7/2015 | Desilva et al. |
| 2015/0198216 | A1 | | 7/2015 | Koyama et al. |
| 2015/0361993 | A1 | | 12/2015 | An et al. |
| 2016/0016316 | A1 | | 1/2016 | Fowler |
| 2016/0102554 | A1 | | 4/2016 | Cornell |
| 2016/0223496 | A1 | | 8/2016 | Klos et al. |
| 2017/0138811 | A1 | | 5/2017 | Inoue et al. |
| 2018/0348303 | A1 | | 12/2018 | Unnikrishnan et al. |
| 2019/0058370 | A1 | * | 2/2019 | Tinney ............ H02K 5/16 |
| 2019/0162622 | A1 | | 5/2019 | Miura et al. |
| 2019/0301359 | A1 | | 10/2019 | Yamashita et al. |

FOREIGN PATENT DOCUMENTS

| | | | |
|---|---|---|---|
| CN | 101305272 | A | 11/2008 |
| CN | 101688816 | A | 3/2010 |
| CN | 204239602 | U | 4/2015 |
| CN | 104776140 | A | 7/2015 |
| CN | 104895807 | A | 9/2015 |
| CN | 106641057 | A * | 5/2017 |
| CN | 108757830 | A * | 11/2018 |
| DE | 102007058592 | A1 | 6/2009 |
| DE | 102008025906 | A1 | 12/2009 |
| EP | 0 355 656 | B1 | 2/1990 |
| EP | 2172758 | A1 | 4/2010 |
| EP | 2581553 | A1 | 4/2013 |
| EP | 2960465 | A1 | 12/2015 |
| JP | 61-265533 | A | 11/1986 |
| JP | 62-135743 | A | 6/1987 |
| JP | 3-503315 | A | 7/1991 |
| JP | 4-103234 | U | 9/1992 |
| JP | 7-18746 | B2 | 3/1995 |
| JP | 2001-74547 | A | 3/2001 |
| JP | 2003-240054 | A | 8/2003 |
| JP | 2004-278580 | A | 10/2004 |
| JP | 3835501 | B2 | 10/2006 |
| JP | 4232841 | B2 | 3/2009 |
| JP | 4236510 | B2 | 3/2009 |
| JP | 2011-106845 | A | 6/2011 |
| JP | 2013-508599 | A | 3/2013 |
| JP | 2014-215160 | A | 11/2014 |
| KR | 10-2007-0056700 | A | 6/2007 |
| WO | WO 2015/198487 | A1 | 12/2015 |

OTHER PUBLICATIONS

Chinese Office Action and Search Report dated Oct. 14, 2020 for Application No. 201780045199.1 with an English translation of the Office Action.
International Search Report (PCT/ISA/210) issued in PCT/JP2017/043187, dated Mar. 6, 2018.
Written Opinion (PCT/ISA/237) issued in PCT/JP2017/043187, dated Mar. 6, 2018.
Extended Suropean Search Report dated Oct. 28, 2019 issued in the corresponding European Application No. 17877700.9.
Office Action dated Mar. 3, 2020 issued to the corresponding Chinese Application No. 201780045199.1.
Japanese Office Action for Japanese Application No. 2016-237649, dated May 26, 2020, with English Machine translation.
European Office Action effective Mar. 9, 2020 issued to the European Application No. 16903130.9.
Extended European Search Report effective Jun. 7, 2019 issued to the European Application No. 16903130.9.
International Preliminary Report on Patentability and Written Opinion of the International Searching Authority (forms PCT/IB/373, PCT/ISA/237, PCT/IB/326 and PCT/IB/338, dated Dec. 6, 2018, for International Application No. PCT/JP2016/065543, with translation of the Written Opinion.
International Search Report (forms PCT/ISA/210 and PCT/ISA/220), dated Jul. 26, 2016, for International Application No. PCT/JP2016/065543.
Japanese Office Action for Japanese Application No. 2018-518879, dated Aug. 6, 2019, with English translation.
U.S. Office Action dated Jun. 19, 2020, for U.S. Appl. No. 16/303,058.
Office Action dated Jul. 3, 2020 issued in relevant Chinese Application No. 201680085941.7 with machine translation.
Car Tech Books, "Anatomy of a Turbocharger: What's Inside and How it Works," https://www.cartechbooks.com/techtips/anatomy-of-a-turbocharger-whats-inside-and-how-it-works, Feb. 3, 2015, 23 pages.

(56) References Cited

OTHER PUBLICATIONS

Chinese Office Action and Search Report dated Jun. 2, 2020, for Chinese Application No. 201680085938.5, with machine translation of the Chinese Office Action.
European Office Action dated Sep. 19, 2019 issued in the European Application No. 16903131.7.
International Preliminary Report on Patentability and Written Opinion of the International Searching Authority, dated Dec. 6, 2018, for International Application No. PCT/JP2016/065544, with translation of the Written Opinion.
International Search Report, dated Jul. 26, 2016, for International Application No. PCT/JP2016/065544, with an English translation.
Japanese Office Action, dated Aug. 13, 2019 issued in the Japanese Application No. 2018-518880, with an English translation.
Supplementary European Search Report effective Apr. 25, 2019 issued in the European Application No. 16903131.7.
U.S. Office Action dated Jun. 18, 2020, for U.S. Appl. No. 16/302,232.

* cited by examiner

VIBRATION INSULATOR AND UNBALANCE DETECTION DEVICE INCLUDING VIBRATION INSULATOR

TECHNICAL FIELD

The present disclosure relates to a vibration insulator mounted between a cartridge including: a rotor having a wheel and a rotational shaft; and a bearing housing accommodating a bearing rotatably supporting the rotor, and a wheel-side housing pressed to the bearing housing in the axial direction.

BACKGROUND ART

For a cartridge, which is a core component of a turbocharger, balancing of a rotor forming the cartridge is performed after assembling the cartridge (see Patent Documents 1 and 2, for instance). This balancing work includes unbalance detection of detecting unbalance of a rotor while the rotor is in rotation, and is a series of works including slightly grinding a part of the rotor to balance the rotor, for instance, if unbalance of the rotor is detected. The balancing work of a rotor at the time of manufacturing prevents vibration upon rotation due to unbalance of the rotor which rotates at high speed during operation of an engine, noise due to vibration, breakage, etc.

More specifically, in unbalance detection, while a cartridge is supported (fixed) with an unbalance detection device, air is supplied to a compressor wheel to create a state where the rotor is rotating, and vibration upon rotation due to unbalance of the rotor is detected with an acceleration sensor (vibration sensor). The phase of the rotor that causes vibration is determined on the basis of a relationship between the vibration signal detected with the acceleration sensor and the phase of the rotor detected simultaneously with the vibration signal. Then, the rotor is ground for balancing, where a relationship between the mass to be ground (unit weight) and the change in the magnitude of vibration accompanying the grinding (effect vector) is obtained in advance through experiments by using a cartridge of the same model (production). Further, on the basis of the above vibration signal, phase, and effect vector (experiment result), grinding information that includes the optimum mass (weight) and position for balancing the rotor is calculated, and the rotor is ground on the basis of the grinding information.

Meanwhile, the unbalance detection device uses, for instance, two housing members to accommodate a turbine wheel or a compressor wheel of the rotor, respectively, and supports the bearing housing directly from both sides. In this context, Patent Document 1 discloses that the respective housing members of the turbine-wheel side and the compressor-wheel side are fixed to each other with bolts via a fixing rod. In this bolt-fixing method, the bolt-fastening work is required every time the work-target cartridge is mounted to the unbalance detection device, which leads to deterioration of the productivity. On the other hand, Patent Document 2 discloses an unbalance correction device capable of supporting one side of a cartridge by a clamping method of supporting without fixing with bolts, and reducing the influence of resonance due to coincidence of the natural frequency of the unbalance detection device side and the rotation frequency of the rotor accompanying rotation of the rotor, and improving the accuracy regarding the unbalance correction.

Furthermore, in Patent Documents 1 and 2 described above, when the cartridge is supported by the clamping method, the housing member and the bearing housing of the cartridge are in direct contact. Thus, vibration upon rotation of the rotor is transmitted appropriately to the housing member, via the bearing housing of the bearing supporting the rotor. Hence, the acceleration sensor (vibration sensor) for detecting vibration upon rotation of the rotor is disposed not on the cartridge side, but on the housing member of the unbalance detection device. With this configuration, it is unnecessary to provide an acceleration sensor for each cartridge every time each of manufactured cartridges is provided for an unbalance detection device, which makes it possible to improve the efficiency of the sensor installation work in the balancing work and detect vibration of the rotor efficiently.

CITATION LIST

Patent Literature

Patent Document 1: JPH3-503315A
Patent Document 2: JP4232841B

SUMMARY

Problems to be Solved

As disclosed in Patent Document 2 described above, it is more advantageous to support the cartridge by the clamping method than the bolt-fixing method, in terms of productivity. In the bolt-fixing method, the bolts need to be fastened or detached, which increases the work time and costs. Thus, it is particularly suitable to support mass-produced cartridges by the clamping method. However, in the clamping method, the cartridge is not fixed firmly with bolts, and thus the stability in supporting the cartridge is not as high as the bolt-fixing method. Thus, in Patent Document 2, the different manners of direct contact between the bearing housing and the housing member (how the bearing housing and the housing member contact directly) may affect the vibration property upon rotation of the rotor significantly, such as a change in the resonance point of resonance between the cartridge and the device described above.

For instance, the above-described effect vector is obtained in a state where the bearing housing of the cartridge and the housing member are stably supported, such as being fixed with bolts. Thus, if the vibration property changes depending on the manner of contact between the members, the correspondence relationship between the cartridge under the balancing work and the effect vector may become inappropriate, which makes it difficult to calculate the grinding information accurately, and also leads to reduction in yield such as resulting in defective products. Furthermore, if it is necessary to perform a work for re-doing the support (installation) of the cartridge to the unbalance detection device (re-clamping) to achieve an appropriate correspondence relationship with the effect vector, it leads to deterioration of the productivity of the cartridge.

One possible solution for the above-described problems of the clamping method is to increase the pressing force (clamping force) for supporting the bearing housing nipped between the two housing members from both sides. However, the increase in pressing force has a limit, particularly, in view of the strength of the cartridge. Under such circumstances, the present inventors have found a method of mounting a vibration insulator between the bearing housing and each of the two housing members and thereby insulating vibration of the members (reducing vibration to be transmitted) to sufficiently suppress the influence of different contact manners between the members. Further, the inventors realize that such a vibration insulator may receive a large pressing force at clamping, and thus the durability is important in terms of productivity and cost.

In view of the above, an object of at least one embodiment of the present invention is to provide a vibration insulator excellent in durability for vibration insulation between a cartridge and a wheel-side housing.

Solution to the Problems (1) According to at least one embodiment of the present invention, a vibration insulator mounted between a cartridge and a wheel-side housing, the cartridge including: a rotor having a wheel and a rotational shaft; and a bearing housing accommodating a bearing rotatably supporting the rotor, the wheel-side housing being to be pressed to the bearing housing in an axial direction, includes: an annular outer ring portion having a wheel-side contact surface configured to come into contact with the wheel-side housing; an annular inner ring portion disposed inside the outer ring portion with a clearance from the outer ring portion and having a bearing-side contact surface configured to come into contact with the bearing housing; and a flexible support portion interposed between the outer ring portion and the inner ring portion and connecting the outer ring portion and the inner ring portion, the flexible support portion being elastically deformable.

With the above configuration (1), the outer ring portion in contact with the wheel-side housing is connected to the inner ring portion in contact with the bearing housing (cartridge) via the flexible support portion which is elastically deformable. Further, when the wheel-side housing is pressed to the bearing housing, the flexible support portion elastically deforms, and the bearing housing and the wheel-side housing thereby move in different directions from each other in the axial direction. If the rotor is rotated in this state, the flexible support portion subjected to elastic deformation in the radial direction or the axial direction sufficiently damps (reduces) vibration caused in the wheel-side housing to be transmitted from the outer ring portion toward the inner ring portion or vibration upon rotation due to unbalance of the rotor to be transmitted from the inner ring portion toward the outer ring portion. Thus, it is possible to insulate vibration between the cartridge and the wheel-side housing (reduce vibration to be transmitted). Further, the vibration insulator with the above configuration provides a sufficient damping effect even without using a material having low elastic modulus such as rubber. Accordingly, by producing the vibration insulator from a material having high strength such as metal, it is possible to provide the vibration insulator excellent in durability.

(2) In some embodiments, in the above configuration (1), the flexible support portion includes: an annular plate spring part having an annular shape and disposed in the clearance; an outer-ring-side joint part connecting the outer ring portion and a part of the annular plate spring part; and an inner-ring-side joint part connecting the inner ring portion and a part of the annular plate spring part at a portion different in a circumferential direction from a portion where the outer-ring-side joint part is connected to the annular plate spring part. With the above configuration (2), the elastic deformable flexible support portion can be formed by the annular plate spring part mutually connecting the inner ring portion and the outer ring portion.

(3) In some embodiments, in the above configuration (2), the outer-ring-side joint part and the inner-ring-side joint part are located on a same first straight line passing through a central line of the inner ring portion.

With the above configuration (3), it is possible to provide the vibration insulator which enables appropriate vibration insulation with respect to vibration transmitted to the annular plate spring part while ensuring an appropriate durability to the pressing force for pressing the bearing housing to the wheel-side housing.

(4) In some embodiments, in the above configuration (2) or (3), an angle between a first-end-side straight line passing through a center of the inner ring portion and a first end of the inner-ring-side joint part in the circumferential direction and a second-end-side straight line passing through the center of the inner ring portion and a second end of the inner-ring-side joint part in the circumferential direction is 30 degrees or more and 90 degrees or less.

With the above configuration (4), in the outer-ring-side joint part and the inner-ring-side joint part, it is possible ensure an appropriate durability to the pressing force for pressing the bearing housing to the wheel-side housing.

(5) In some embodiments, in the above configuration (1), the flexible support portion includes a plurality of wave-shaped plate spring parts disposed in the clearance and including an elementary wave-shaped plate spring part folded in a wave shape along a radial direction.

With the above configuration (5), the elastic deformable flexible support portion can be formed by the plurality of wave-shaped plate spring parts including the elementary wave-shaped plate spring part of wave shape connecting the inner ring portion and the outer ring portion.

(6) In some embodiments, in the above configuration (5), the wave-shaped plate spring parts are arranged at equal intervals along a circumferential direction in the clearance. With the above configuration (6), it is possible to uniformly distribute the pressing force applied in the axial direction over the wave-shaped plate spring parts. Thus, it is possible to prevent the pressing force being concentrated on a part of the wave-shaped plate spring parts, and it is possible to provide the vibration insulator which enables appropriate vibration insulation with respect to vibration transmitted to each of the wave-shaped plate spring parts.

(7) In some embodiments, in the above configuration (5) or (6), each of the wave-shaped plate spring parts has a plurality of elementary wave-shaped plate spring parts.

The present inventors found that, in a limited space formed between the outer ring portion and the inner ring portion, the more the elementary wave-shaped plate spring parts and the more the wave-shaped folds in the elementary wave-shaped plate spring parts, the greater the durability to the pressing force and the vibration insulation property, through mathematical analysis.

With the above configuration (7), since each of the wave-shaped plate spring parts includes a plurality of elementary wave-shaped plate spring parts, more wave-shaped spring structures can be formed in the limited clearance formed between the outer ring portion and the inner ring portion. Thus, it is possible to improve appropriate durability to the pressing force of the vibration insulator and insulation performance.

(8) In some embodiments, in the above configuration (7), the number of the wave-shaped plate spring parts is four, and the number of the elementary wave-shaped plate spring parts is two.

According to the above configuration (8), the flexible support portion has eight wave-shaped spring structures in total. Thus, it is possible to provide the vibration insulator having appropriate durability to the pressing force of the vibration insulator and vibration insulation property.

(9) In some embodiments, in the above configuration (7) or (8), the number of the elementary wave-shaped plate spring parts is two, and the two elementary wave-shaped plate spring parts are arranged in a line-symmetric manner in the radial direction.

With the above configuration (9), since the two elementary wave-shaped plate spring parts extending in the radial direction are arranged in a line-symmetric manner in the radial direction, it is possible to provide the vibration insulator which enables appropriate vibration insulation.

(10) In some embodiments, in any one of the above configurations (7) to (9), each elementary wave-shaped plate spring part includes: a plurality of circumferential plate parts separated from each other in the radial direction and each extending in a circumferential direction; a plurality of first-end-side coupling plate parts each connecting first ends of adjacent two of the circumferential plate parts on a first side in the radial direction, along the radial direction; and a plurality of second-end-side coupling plate parts each connecting second ends of adjacent two of the circumferential plate parts on a second side in the radial direction, along the radial direction.

With the above configuration (10), the elementary wave-shaped plate spring part can be formed by the plurality of circumferential plate parts, the plurality of first-end-side coupling plate parts, and the plurality of second-end-side coupling plate parts.

(11) In some embodiments, in the above configuration (10), the number of the circumferential plate parts is an odd number of 3 or more.

With the above configuration (11), it is possible to provide the vibration insulator having appropriate durability to the pressing force and vibration insulation property. Further, when the number of the circumferential plate parts is odd, the numbers of the first-end-side coupling plate part and the second-end-side coupling plate part are the same. Thus, it is possible to equalize the elasticity on the first end side and the elasticity on the second end side in the circumferential plate part.

(12) In some embodiments, in any one of the above configurations (1) to (11), the wheel-side contact surface of the outer ring portion is configured to come into contact with a sealing member for preventing air inside the wheel-side housing from flowing out via the clearance.

With the above configuration (12), even when the vibration insulator has the clearance formed between the outer ring portion and the inner ring portion, the sealing member prevents the air inside the wheel-side housing from flowing to the outside via the clearance. Thus, during the unbalance detection work of the rotor of the cartridge, the rotation air supplied into the wheel-side housing to rotate the rotor inside the wheel-side housing therein is prevented from flowing to the outside via the clearance. Consequently, the unbalance detection work can be appropriately performed.

(13) In some embodiments, in the above configuration (12), a gap is each formed between the inner ring portion and the sealing member and between the flexible support portion and the sealing member, in a state where the wheel-side hosing is pressed to the bearing housing in the axial direction.

With the above configuration (13), the gaps formed between the sealing member and the inner ring portion and between the sealing member and the flexible support portion prevent direct contact between the sealing member and the inner ring portion or the flexible support portion subjected to elastic deformation due to vibration or the like, thus enabling appropriate vibration insulation. Further, with this configuration, it is possible to prevent breakage of the vibration insulator or the sealing member and ensure the durability of the vibration insulator.

(14) In some embodiments, in any one of the above configurations (1) to (13), the wheel-side contact surface of the outer ring portion is located on a wheel side in a radial direction relative to the inner ring portion and the flexible support portion in a state where the wheel-side hosing is not pressed to the bearing housing in the axial direction.

With the above configuration (14), the vibration insulator can prevent a situation where an end portion of the inner ring portion opposite to the bearing-side contact surface physically interferes with the wheel-side housing such as the sealing member, when the wheel-side housing is pressed to the bearing housing in the axial direction, and thereby the inner ring portion in contact with the bearing housing side is pressed toward the wheel-side housing.

(15) In some embodiments, in the above configuration (14), the bearing-side contact surface of the inner ring portion is located on a cartridge side in the radial direction relative to the outer ring portion and the flexible support portion in a state where the wheel-side hosing is not pressed to the bearing housing in the axial direction.

With the above configuration (15), the vibration insulator can prevent a situation where an end portion of the inner ring portion opposite to the bearing-side contact surface physically interferes with the wheel-side housing, when the wheel-side housing is pressed to the bearing housing in the axial direction, and thereby the inner ring portion in contact with the bearing housing side is pressed toward the wheel-side housing.

(16) In some embodiments, in any one of the above configurations (1) to (15), each of the outer ring portion, the inner ring portion, and the flexible support portion is made of a metal.

With the above configuration (16), it is possible to provide the vibration insulator excellent in durability compared with one made of a resin or rubber, for instance.

(17) According to at least one embodiment of the present invention, an unbalance detection device for detecting unbalance of a rotor of a cartridge including: the rotor having a wheel and a rotational shaft; and a bearing housing accommodating a bearing rotatably supporting the rotor includes: a wheel-side housing member accommodating the wheel; a support mechanism pressing the wheel-side housing member to the bearing housing to support the cartridge; a vibration sensor capable of detecting vibration upon rotation of the rotor; and a vibration insulator described in any one of the above (1) to (16) mounted between the wheel-side housing member and the bearing housing.

With the above configuration (17), the cartridge is sandwiched and supported from both sides by the turbine-side housing member and the compressor-side housing member via the vibration insulator. In other words, the vibration insulator insulates vibration (reduces vibration to be transmitted) on the unbalance detection device side and the cartridge side. Thus, in the unbalance detection work, it is possible to suppress resonance on the unbalance detection device side in response to vibration upon rotation of the rotor, and it is possible to improve the accuracy regarding unbalance detection and the efficiency of the balancing work.

Further, the provision of the vibration sensor on the bearing housing of the cartridge enables detection of vibration of the rotor in a state where the vibration insulator is not disposed in a vibration transmission path between the rotor and the vibration sensor. Thus, it is possible to efficiently detect vibration of the rotor.

Advantageous Effects

At least one embodiment of the present invention provides a vibration insulator excellent in durability for vibration insulation between a cartridge and a wheel-side housing.

DETAILED DESCRIPTION

Embodiments of the present invention will now be described in detail with reference to the accompanying drawings. It is intended, however, that unless particularly identified, dimensions, materials, shapes, relative positions and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

Figure 1:
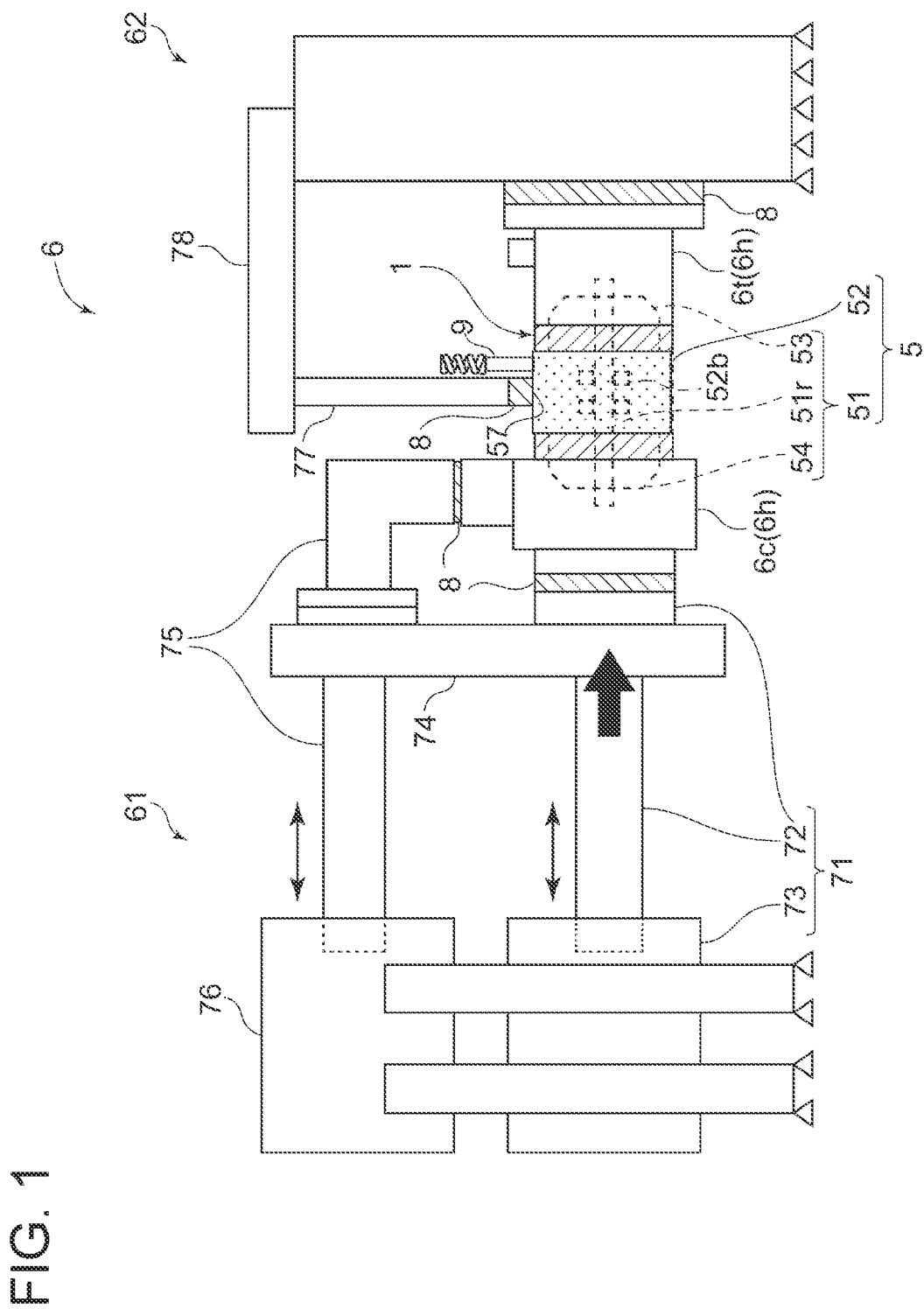
FIG. 1 is a schematic diagram of an unbalance detection device used for correcting unbalance of a cartridge according to an embodiment of the present invention, illustrating a state where the cartridge is supported by the unbalance detection device.

FIG. 1 is a schematic diagram of an unbalance detection device 6 used for correcting unbalance of a cartridge 5 according to an embodiment of the present invention, illustrating a state where the cartridge 5 is supported by the unbalance detection device 6.

Figure 2:
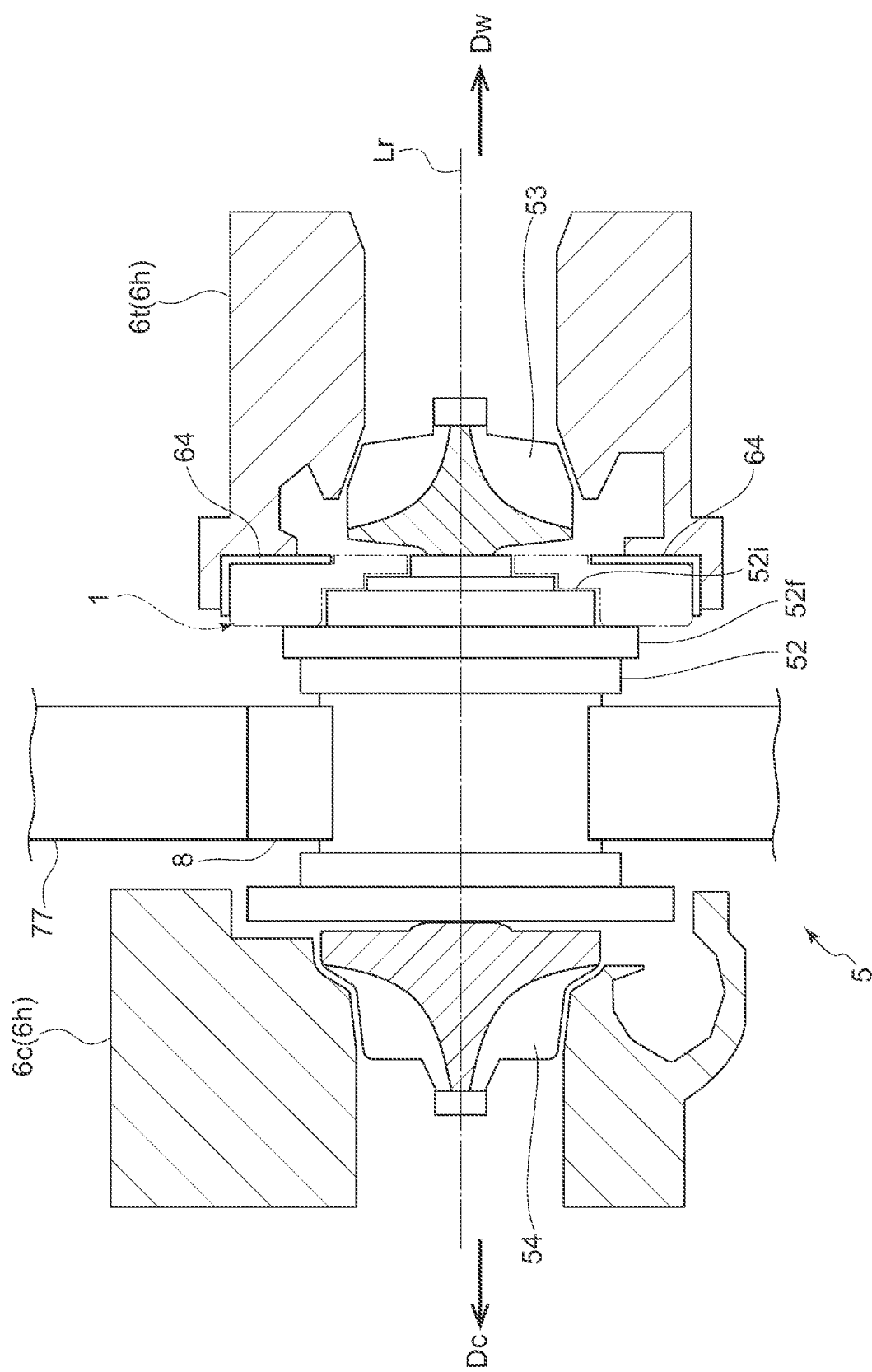
FIG. 2 is an enlarged peripheral view of the cartridge of FIG. 1.

FIG. 2 is an enlarged peripheral view of the cartridge 5 of FIG. 1.

The cartridge 5 is a core component of a turbocharger and includes, as shown in FIGS. 1 and 2, a rotor 51 integrally coupling a turbine wheel 53 and a compressor wheel 54 with a rotational shaft 51$r$, and a bearing housing 52 which accommodates a bearing 52$b$ supporting the rotor 51 rotatably. Further, when the cartridge 5 is provided for an engine of a non-depicted automobile, for instance, the cartridge 5 is configured so that the turbine wheel 53 disposed in an exhaust passage of the engine rotates due to exhaust gas discharged from the engine, and thereby the compressor wheel 54 coaxially coupled by the rotational shaft 51$r$ rotates in an intake passage of the engine, thereby compressing intake air to the engine.

Meanwhile, the unbalance detection device 6 is a device for supporting a target to be subjected to unbalance correction. In the embodiment shown in FIGS. 1 and 2, the unbalance detection device 6 nips the work-target cartridge 5 from both sides to support the cartridge 5 with two housing members: a turbine-side housing member 6$t$ and a compressor-side housing member 6$c$. More specifically, the unbalance detection device 6 supports the cartridge 5 by pressing at least one of the two housing members to the other with a support mechanism, while the turbine wheel 53 and the compressor wheel 54 of the cartridge 5 are accommodated in the two housing members (6$t$, 6$c$) respectively. At this time, as shown in FIGS. 1 and 2, a later-described vibration insulator 1 is disposed in at least one of a portion between the turbine-side housing member 6$t$ and the cartridge 5 or a portion between the compressor-side housing member 6$c$ and the cartridge 5, and the cartridge 5 is supported in contact with the vibration insulator 1.

Although the following embodiments will be described with reference to a cartridge 5 for a turbocharger, in some embodiments, the work-target may be a cartridge 5 for a supercharger, in which the compressor wheel 54 is driven by power from a crank shaft (not shown) or an electric motor. Also in this case, the unbalance detection device 6 nips and supports from both sides the cartridge 5 including the rotor 51 having the compressor wheel 54 and the rotational shaft 51$r$ and the bearing housing 52 which accommodates the bearing 52$b$ rotatably supporting the rotor 51.

The aforementioned support mechanism of the unbalance detection device 6 will be described in more detail. In the embodiment shown in FIGS. 1 and 2, as illustrated, the support mechanism includes a compressor-side support mechanism 61 connected to the compressor-side housing member 6$c$ and a turbine-side support mechanism 62 connected to the turbine-side housing member 6$t$, and the respective support mechanisms (61, 62) are each fixed to the floor of the factory, for instance, so that the cartridge 5 does not move when pushed. Further, the support mechanisms (61, 62) are connected to the two housing members (6$t$, 6$c$) via a device-side vibration insulator 8 (e.g., elastic member such as rubber), above the floor surface. Further, a pressing device 71 is disposed on the compressor-side support mechanism 61. The pressing device 71 is configured to press the compressor-side housing member 6$c$ toward the cartridge 5. The pressing device 71 includes a pressing rod 72 connected to the housing member (6c) and a piston device 73 pushing the pressing rod 72 toward the housing member (6c). As the piston device 73 pushes the pressing rod 72 toward the housing member (6c), the compressor-side housing member (6c) is pressed toward the cartridge 5.

At this time, the pressing device 71, the compressor-side housing member 6c, the cartridge 5, the turbine-side housing member 6t, and the turbine-side support mechanism 62 are arranged in this order along the pressing direction (arrow direction in FIG. 1), and the pressing force by the pressing device 71 is transmitted to the turbine-side support mechanism 62 through this arrangement. Then, the cartridge 5 is supported by the pressing force from the pressing device 71 and the reaction force from the turbine-side support mechanism 62. That is, the support mechanism presses each of the compressor-side housing member 6c and the turbine-side housing member 6t toward the bearing housing 52, thereby supporting the cartridge 5. The pressing rod 72 and an air supply pipe 75 for introducing air from a blower 76 to the housing member are coupled to each other with a coupling member 74, and the air supply pipe 75 is configured to be movable so as to expand and contract from the blower 76 as the pressing rod 72 moves in the pressing direction.

Additionally, in the embodiment shown in FIGS. 1 and 2, as illustrated, the unbalance detection device 6 includes an oil supply pipe 77 for supplying lubricant oil to the bearing 52b accommodated in the bearing housing 52. The oil supply pipe 77 is supported on a tip side of a support arm 78 extending from an upper part of the turbine-side support mechanism 62 to above the compressor-side support mechanism 61. The support arm 78 is capable of moving the oil supply pipe 77 up and down along the vertical direction. Once the oil supply pipe 77 is moved downward in the vertical direction (direction of gravity), the oil supply pipe 77 is connected to an oil supply port 57 formed in the bearing housing 52, and thereby lubricant oil can be supplied to the bearing 52b through the oil supply port 57. The oil supply pipe 77 is connected to the oil supply port 57 of the bearing housing 52 via the device-side vibration insulator 8.

For the unbalance correction work, while the work-target cartridge 5 is supported by the unbalance detection device 6, the cartridge 5 is rotated, as rotated by exhaust gas during operation of an engine, to detect unbalance of the work-target. More specifically, the rotor 51 is rotated by supplying air (gas) to one of the compressor wheel 54 or the turbine wheel 53. In the embodiment shown in FIGS. 1 and 2, the air supply pipe 75 of the support mechanism and the compressor-side housing member 6c are connected via the device-side vibration insulator 8, and air from the blower 76 is supplied to the compressor wheel 54 accommodated in the compressor-side housing member 6c via the air supply pipe 75. The air rotates the compressor wheel 54, and thereby rotates the turbine wheel 53. In other embodiments, the air supply pipe 75 and the turbine-side housing member 6t may be connected so that air is supplied to the turbine wheel 53 to rotate the rotor 51.

Additionally, as shown in FIG. 1, the unbalance detection device 6 includes a vibration sensor 9 capable of detecting vibration upon rotation of the rotor 51. In the embodiment shown in FIGS. 1 and 2, the vibration sensor 9 is a contact-type sensor, which is fixed to a vibration-measurement target to be measured, and the sensor itself vibrates together with the target for detecting vibration. The vibration sensor 9 may be fixed in contact with the bearing housing 52 of the cartridge 5, for instance, or may be fixed in contact with a sensor installation base 32 disposed in an inner ring portion 3 of the vibration insulator 1 described later. By placing the sensor installation base 32 on the inner ring portion 3 without contact with an outer ring portion 2 and a flexible support portion 4 described later, it is possible to detect vibration caused due to unbalance of the rotor 51 transmitted to the inner ring portion 3 through the bearing housing 52 in the unbalance detection, without the influence of vibration transmitted from the outer ring portion 2 to the inner ring portion 3.

However, the invention is not limited to the present embodiment, and the vibration sensor 9 may be a non-contact type sensor. The non-contact type sensor may be fixed to, for instance, the unbalance detection device 6 so as to detect vibration of the bearing housing 52 or the sensor installation base 32. With the vibration sensor 9, it is possible to obtain grinding information for correcting unbalance of the detected rotor 51. The grinding information includes the optimum mass and grinding position for balancing the rotor 51 (work-target), and if unbalance is detected, the rotor 51 (work-target) is ground on the basis of the grinding information.

Figure 3:
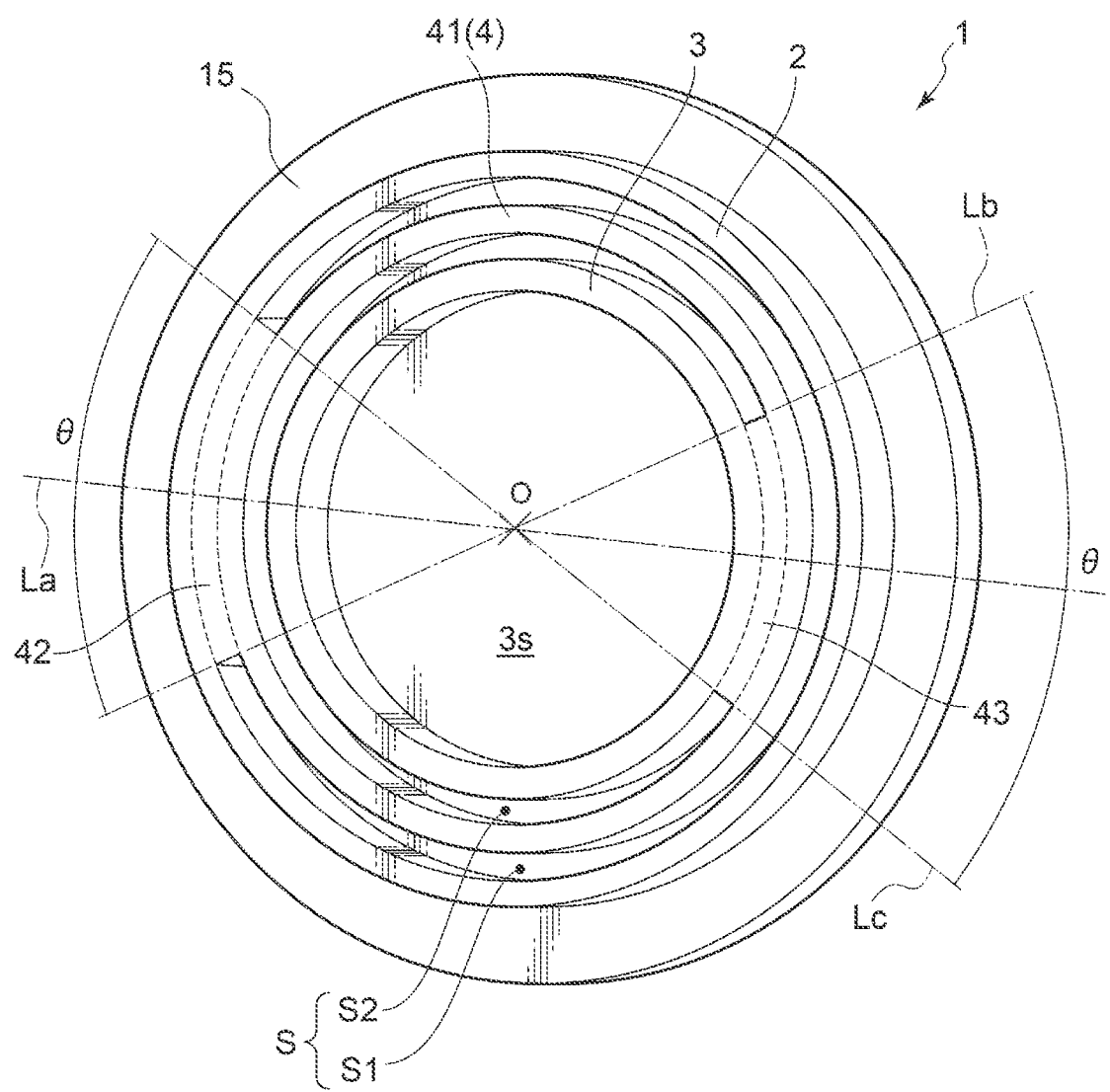
FIG. 3 is a schematic diagram of a vibration insulator to be mounted between a cartridge and a wheel-side housing according to an embodiment of the present invention, where the vibration insulator includes an annular plate spring part.
Figure 4:
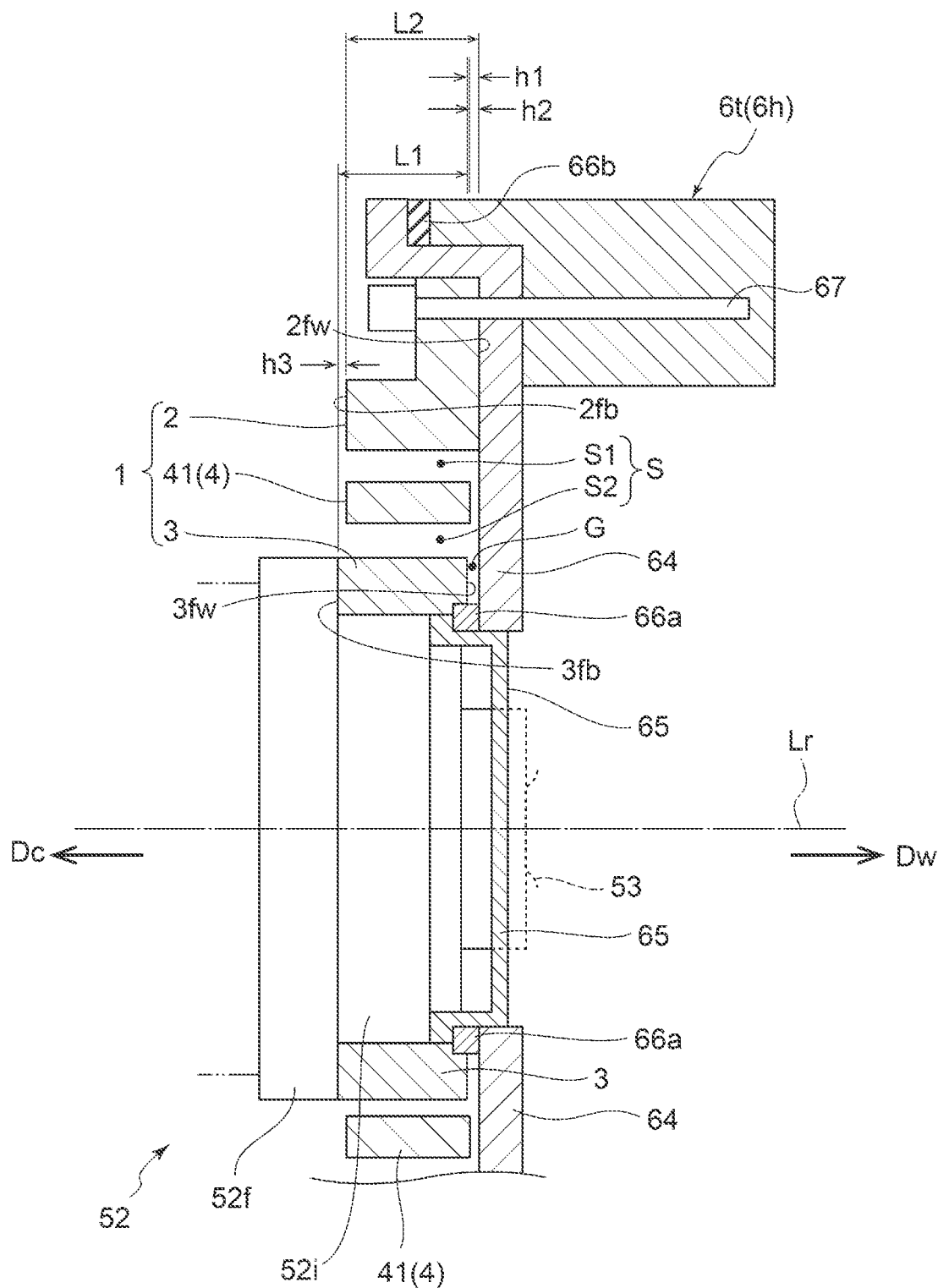
FIG. 4 is a schematic diagram showing a state where the vibration insulator of FIG. 3 is disposed between a cartridge and a wheel-side housing.
Figure 5A:
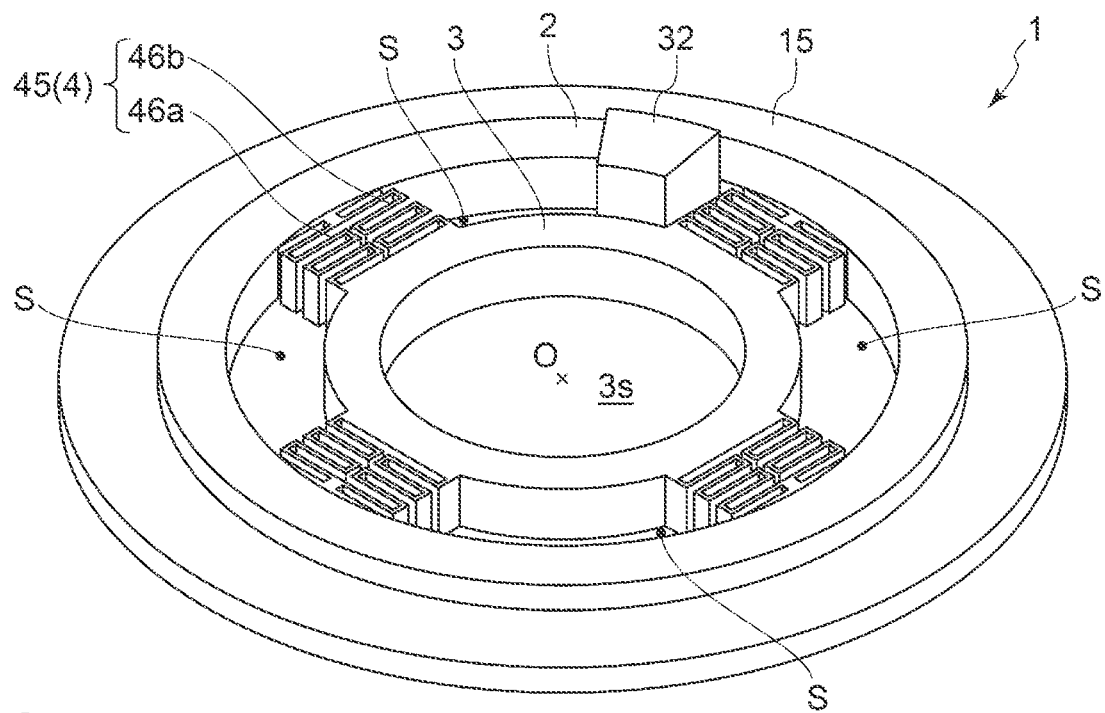
FIG. 5A is a schematic diagram of a vibration insulator to be mounted between a cartridge and a wheel-side housing according to another embodiment of the present invention, where the vibration insulator includes a wave-shaped plate spring part.
Figure 5B:
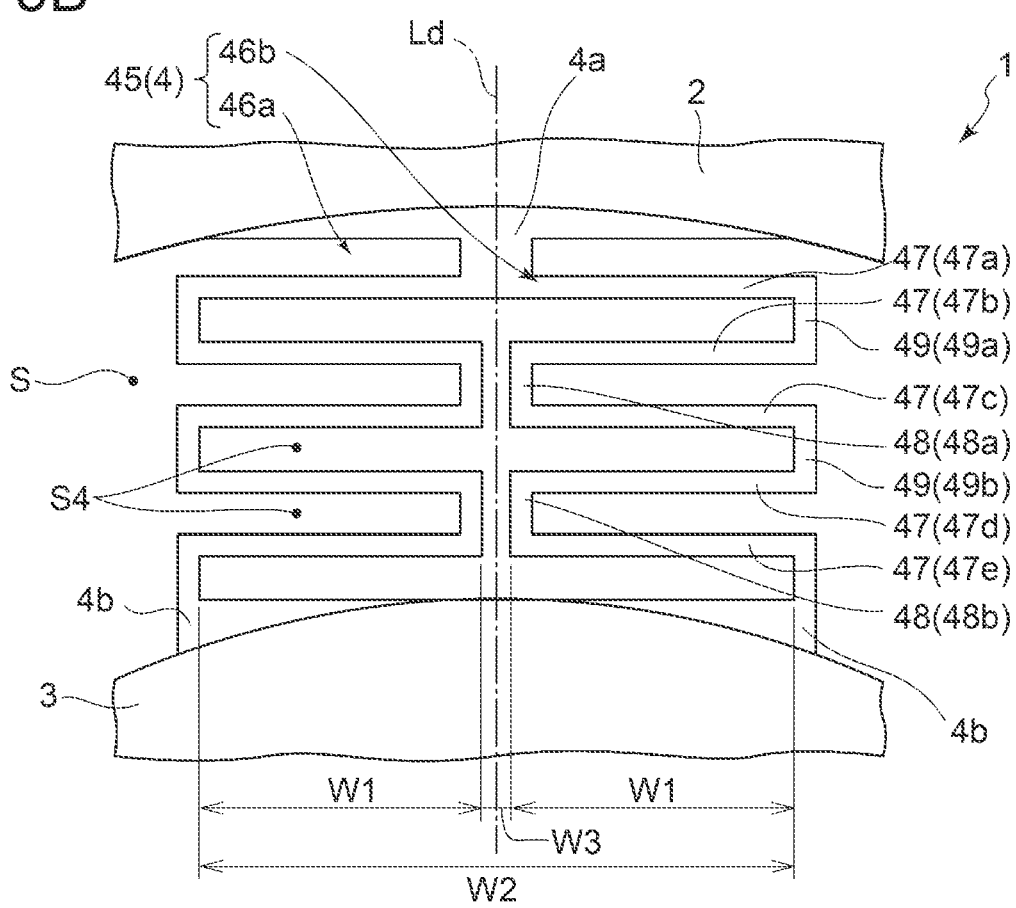
FIG. 5B is an enlarged view of the wave-shaped plate spring part of FIG. 5A.
Figure 6:
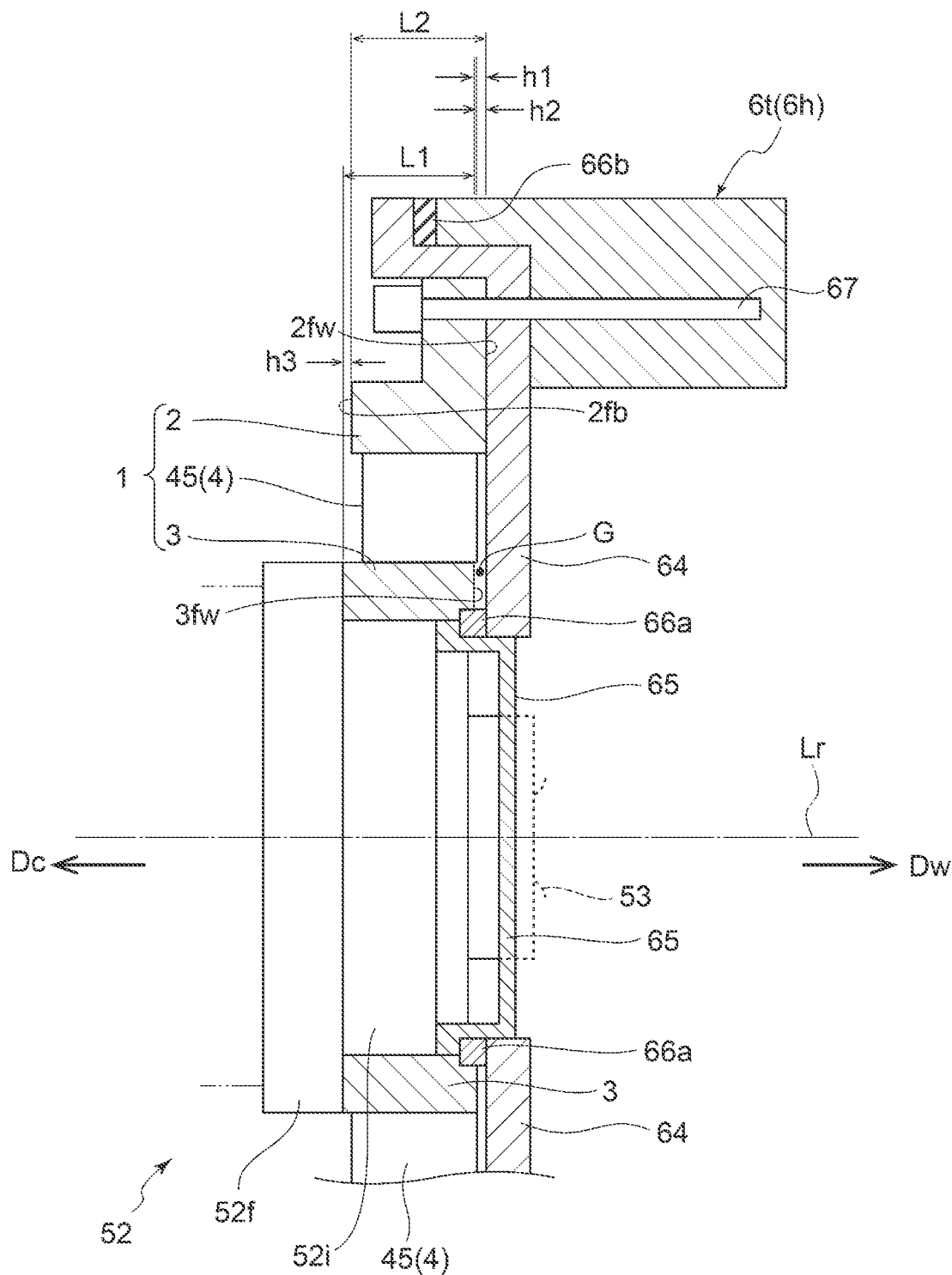
FIG. 6 is a schematic diagram showing a state where the vibration insulator of FIG. 5A is disposed between a cartridge and a wheel-side housing.

Next, the vibration insulator 1 according to the present invention will be described with reference to FIGS. 3 to 6. FIG. 3 is a schematic diagram of the vibration insulator 1 to be mounted between the cartridge 5 and the wheel-side housing 6h according to an embodiment of the present invention, where the vibration insulator 1 includes an annular plate spring part 41. FIG. 4 is a schematic diagram showing a state where the vibration insulator 1 of FIG. 3 is disposed between the cartridge 5 and the wheel-side housing 6h. FIG. 5A is a schematic diagram of the vibration insulator 1 to be mounted between the cartridge 5 and the wheel-side housing 6h according to another embodiment of the present invention, where the vibration insulator 1 includes a wave-shaped plate spring part 45. FIG. 5B is an enlarged view of the wave-shaped plate spring part 45 of FIG. 5A. Further, FIG. 6 is a schematic diagram showing a state where the vibration insulator 1 of FIG. 5A is disposed between the cartridge 5 and the wheel-side housing 6h.

Hereinafter, the wheel means the turbine wheel 53 or the compressor wheel 54 described above, and the wheel-side housing 6h means the turbine-side housing member 6t or the compressor-side housing member 6c in accordance with the type of the wheel. In a case where the vibration insulator 1 is disposed between the cartridge 5 and the turbine-side housing member 6t and between the cartridge 5 and the compressor-side housing member 6c each, the description is interpreted as meaning that the wheel is the turbine wheel 53 and the compressor wheel 54, and the wheel-side housing 6h means the turbine-side housing member 6t and the compressor-side housing member 6c.

Further, hereinafter, the axial direction of the rotational shaft 51r of the cartridge 5 is simply referred to as the axial direction as appropriate; and in the axial direction, a side at which the wheel is located is referred to as wheel side Dw, and a side opposite to the wheel side is referred to as cartridge side Dc.

As shown in FIGS. 1 to 6, the vibration insulator 1 is mounted between the cartridge 5 (described above) which includes: the rotor 51 having the wheel (53, 54) and the rotational shaft 51r; and the bearing housing 52 accommodating the bearing 52b rotatably supporting the rotor 51, and the wheel-side housing 6h (6t, 6c) which is to be pressed to the bearing housing 52 accommodating the wheel in the axial direction of the rotational shaft 51r. Thus, the vibration insulator 1 is configured to insulate vibration to be mutually transmitted between the cartridge 5 and the wheel-side housing 6*h* (reduce vibration to be transmitted).

Further, as shown in FIGS. 3 to 6, the vibration insulator 1 includes an outer ring portion 2, an inner ring portion 3, and a flexible support portion 4.

The outer ring portion 2 has an annular (cylindrical) shape, such as a circular ring shape, and has a wheel-side contact surface 2*fw* configured to come into contact with the wheel-side housing 6*h* (see FIGS. 4 and 6). That is, the annular vibration insulator 1 is supported to the wheel-side housing 6*h* by the outer ring portion 2 in contact with the wheel-side housing 6*h* at the wheel-side contact surface 2*fw*. More specifically, as shown in FIGS. 4 and 6, the outer ring portion 2 may be fixed to the wheel-side housing 6*h* with a bolt 67. In the embodiments shown in FIGS. 3 to 6, as illustrated, the outer ring portion 2 includes a flange part 15 extending around the entire outer circumference of the outer ring portion 2 and having a bolt hole allowing the bolt 67 to be inserted therein (see FIGS. 3 and 5A), and is fixed to the wheel-side housing 6*h* with the bolt 67, while being in contact with a sealing member 64 (described later) of the wheel-side housing 6*h*.

The inner ring portion 3 has an annular (cylindrical) shape, such as a circular ring shape, and is disposed inside the outer ring portion 2 with a clearance S from the outer ring portion 2. This clearance S is formed between the entire outer circumference of the inner ring portion 3 and the entire inner circumference of the outer ring portion. That is, the inner ring portion 3 is not directly connected to the outer ring portion 2, and the flexible support portion 4 described later is interposed between and connects the inner ring portion 3 and the outer ring portion 2 (see FIGS. 3, 5A, and 5B). Further, the inner ring portion 3 has a bearing-side contact surface 3*fb* configured to come into contact with the bearing housing 52. In the embodiments shown in FIGS. 3 to 6, as shown in FIGS. 4 and 6, an axial end portion of the bearing housing 52 includes an insertion part 52*i* inserted into a space (central space 3*s*) in the center of the annular inner ring portion 3 and a flange part 52*f* having a larger diameter than the insertion part 52*i*. When the insertion part 52*i* of the bearing housing 52 is inserted into the central space 3*s* of the inner ring portion 3, the bearing-side contact surface 3*fb* of the inner ring portion 3 comes into contact with the flange part 52*f* of the bearing housing 52. In this state, the inner ring portion 3 supports the cartridge 5.

The flexible support portion 4, which is interposed between the outer ring portion 2 and the inner ring portion 3 and connects the outer ring portion 2 to the inner ring portion 3, is configured to be elastically deformable. More specifically, as shown in FIGS. 4 and 6, in a state where the cartridge 5 and the wheel-side housing 6*h* are in contact with the above-described contact surfaces (wheel-side contact surface 2*fw*, bearing-side contact surface 3*fb*), the pressing force is applied in the axial direction by the above-described support mechanism. Thereby, the cartridge 5 is pressed toward the wheel-side housing 6*h* (wheel side Dw) facing in the axial direction; conversely, the wheel-side housing 6*h* is pressed toward the cartridge 5 (cartridge side Dc) facing in the axial direction (hereinafter, this state is referred to as support state, as appropriate). In this way, when the outer ring portion 2 in contact with the wheel-side housing 6*h* and the inner ring portion 3 in contact with the cartridge 5 are pressed (clamped) in opposite axial directions, the flexible support portion 4 deforms in the axial direction in accordance with the magnitude of the pressing forces (clamping forces); conversely, when the pressing forces are removed, it returns to the initial state where no pressing force is applied (elastic deformation).

Further, the flexible support portion 4 is elastically deformable also in the radial direction of the rotational shaft 51*r* (hereinafter, simply referred to as radial direction) as described later, and thus the flexible support portion 4 elastically deforms in the radial direction or the axial direction in response to vibration. Thus, the flexible support portion 4 reduces (damps) vibration transmitted from the unbalance detection device 6 side to the outer ring portion 2 via the wheel-side housing 6*h*. Further, it damps (reduces) vibration upon rotation mainly caused by unbalance of the rotor 51, transmitted to the inner ring portion 3 via the bearing housing 52.

In the embodiments shown in FIGS. 1 to 6, each of the outer ring portion 2, the inner ring portion 3, and the flexible support portion 4 is made of metal. For instance, the vibration insulator 1 may be produced by casting or grinding a single sheet of a metal material (e.g., wire cutting). The vibration insulator 1 is preferably made of metal to withstand a large pressing force applied in the axial direction in the support state. The metallic insulator is also excellent in durability compared with one made of a resin or rubber. However, the present invention is not limited to these embodiments. In other embodiments, at least one of the outer ring portion 2, the inner ring portion 3, and the flexible support portion 4 may be produced from a material which is not metal but a heat-resistant resin or rubber.

By the vibration insulator 1 with this configuration, the cartridge 5 is supported by the support mechanism via the vibration insulator 1 in a state where the cartridge 5 is not directly in contact with the wheel-side housing 6*h*, but with the vibration insulator 1. In other words, the cartridge 5 is supported by the support mechanism only via the vibration insulator 1. Further, in the support state of the cartridge 5, as described above, if vibration occurs due to unbalance of the rotor 51 upon rotation of the rotor 51 inside the cartridge 5 for the unbalance detection work, the vibration is transmitted from the bearing housing 52 supporting the bearing 52*b* to the inner ring portion 3 in contact with the bearing housing 52. Then, the vibration transmitted to the inner ring portion 3 attempts to be transmitted to the outer ring portion 2 and the wheel-side housing 6*h* sequentially, via the flexible support portion 4. Moreover, vibration occurring on the unbalance detection device 6 side is transmitted from the wheel-side housing 6*h* to the outer ring portion 2 and then attempts to be transmitted to the inner ring portion 3 and the cartridge 5 (bearing housing 52) via the flexible support portion 4.

However, since the outer ring portion 2 and the inner ring portion 3 are connected via the flexible support portion 4 which is elastically deformable, the flexible support portion 4 elastically deforms in the radial direction or the axial direction in response to the transmitted vibration, thereby sufficiently damping (reducing) the vibration from the outer ring portion 2 toward the inner ring portion 3 or from the inner ring portion 3 toward the outer ring portion 2. Thus, it is possible to insulate vibration between the cartridge 5 and the wheel-side housing 6*h* (reduce vibration to be transmitted). Further, the vibration insulator 1 with the above configuration provides a sufficient damping effect even without using a material having low elastic modulus such as rubber. Accordingly, by producing the vibration insulator 1 from a material having high strength such as metal, it is possible to provide the vibration insulator 1 excellent in durability.

Next, embodiments regarding a specific configuration of the flexible support portion 4 of the vibration insulator 1 described above will be described with reference to FIGS. 3 to 6.

FIGS. 3 and 4 show an embodiment relating to the annular plate spring part 41, and FIGS. 5A to 6 show an embodiment relating to the wave-shaped plate spring part 45.

In some embodiments, as shown in FIGS. 3 and 4, the flexible support portion 4 of the vibration insulator 1 includes an annular plate spring part 41 of annular shape disposed in the clearance S formed between the outer ring portion 2 and the inner ring portion 3, an outer-ring-side joint part 42 connecting a part of the annular plate spring part 41 and the outer ring portion 2, and an inner-ring-side joint part 43 connecting a part of the annular plate spring part 41 and the inner ring portion 3 at a portion different in the circumferential direction from a portion where the outer-ring-side joint part 42 is connected to the annular plate spring part 41. In the embodiment shown in FIGS. 3 and 4, as described above, the outer ring portion 2 is supported to the wheel-side housing 6h, and the annular plate spring part 41 is supported to the outer ring portion 2 via the outer-ring-side joint part 42 and supports the inner ring portion 3 via the inner-ring-side joint part 43.

More specifically, as shown in FIG. 3, the annular plate spring part 41 is provided in the clearance S between the outer ring portion 2 and the inner ring portion 3, in a state where the annular plate spring part 41 has an outer clearance S1 from the outer ring portion 2 and an inner clearance S2 from the inner ring portion 3 except for jointed portions with the outer-ring-side joint part 42 and the inner-ring-side joint part 43. In other words, the outer clearance S1 and the inner clearance S2 are formed between the outer ring portion 2 and the inner ring portion 3 defined on the annular member to reduce stiffness at this portion and enable elastic deformation at a portion (annular plate spring part 41) between the outer clearance S1 and the inner clearance S2. Further, the annular plate spring part 41 is elastically displaced in the radial direction or the axial direction in response to vibration from the outer ring portion 2 toward the inner ring portion 3 or vibration from the inner ring portion 3 toward the outer ring portion 2 to damp (reduce) vibration, thus enabling vibration insulation. At this time, when the outer clearance S1 and the inner clearance S2 exist, collision of the annular plate spring part 41 with the outer ring portion 2 or the inner ring portion 3 at elastic deformation is avoided. Thus, it is possible to sufficiently reduce vibration.

With the above configuration, the elastic deformable flexible support portion 4 can be formed by the annular plate spring part 41 mutually connecting the outer ring portion 2 and the inner ring portion 3.

In the above-described embodiment, in some embodiments, as shown in FIG. 3, the outer-ring-side joint part 42 and the inner-ring-side joint part 43 may be located on the same line, namely, a first straight line La passing through the center O of the inner ring portion 3. In the embodiment shown in FIGS. 3 and 4, the outer ring portion 2, the inner ring portion 3, and the flexible support portion 4 formed in an annular (cylindrical) shape are concentric about the center O. Further, the outer-ring-side joint part 42 and the inner-ring-side joint part 43 are arranged so that the first straight line La passes through the center of the outer-ring-side joint part 42 and the center of the inner-ring-side joint part 43 in the circumferential direction of the rotational shaft 51r (hereinafter, simply referred to as circumferential direction). In other words, the outer-ring-side joint part 42 and the inner-ring-side joint part 43 are disposed 180 degrees opposite to each other across the center O.

As described above, as the wheel-side housing 6h is pressed to the bearing housing 52 in the axial direction, the pressing force is applied to the annular plate spring part 41 via the outer-ring-side joint part 42 and the inner-ring-side joint part 43; the above-described arrangement allows this pressing force in the axial direction to be uniformly distributed over the entire circumference of the annular plate spring part 41. Thereby, the annular plate spring part 41 can flexibly elastically deform in the axial direction or the radial direction at each position on the entire circumference of the annular plate spring part 41 in response to vibration transmitted to the annular plate spring part 41, compared with a case where the outer-ring-side joint part 42 and the inner-ring-side joint part 43 are not located on the first straight line La. Thus, it is possible to more effectively insulate vibration.

With the above configuration, since the outer-ring-side joint part 42 and the inner-ring-side joint part 43 are each located on the same first straight line La passing through the center O of the inner ring portion 3, it is possible to provide the vibration insulator 1 which enables appropriate vibration insulation with respect to vibration transmitted to the annular plate spring part 41 while ensuring an appropriate durability to the pressing force for pressing the bearing housing 52 to the wheel-side housing 6h.

The present invention is not limited to the present embodiment. In some embodiments, the outer-ring-side joint part 42 and the inner-ring-side joint part 43 may not be located on the same first straight line La.

Additionally, in the above-described embodiment, in some embodiments, as shown in FIG. 3, an angle θ between a first-end-side straight line Lb passing through the center O of the inner ring portion 3 and a first end of the inner-ring-side joint part 43 in the circumferential direction and a second-end-side straight line Lc passing through the center O of the inner ring portion 3 and a second end of the inner-ring-side joint part 43 in the circumferential direction may be 30 degrees or more and 90 degrees or less (30°≤θ≤90°). As described above, the inner-ring-side joint part 43 is disposed on a part of the inner circumference of the annular plate spring part 41 and the outer circumstance of the inner ring portion 3, and the inner-ring-side joint part 43 is formed so as to have a length in the circumferential direction within a range of 30 degrees or more and 90 degrees or less around the center O. In the embodiment shown in FIGS. 3 to 4, as shown in FIG. 3, the angle θ is 60 degrees (θ=60°). Further, the outer-ring-side joint part 42 has the same length in the circumferential direction as the inner-ring-side joint part 43. However, the present invention is not limited to the present embodiment. In other embodiments, the outer-ring-side joint part 42 and the inner-ring-side joint part 43 may have different lengths in the circumferential direction.

With the above configuration, in the outer-ring-side joint part 42 and the inner-ring-side joint part 43, it is possible ensure an appropriate durability to the pressing force for pressing the bearing housing 52 to the wheel-side housing 6h.

The present invention is not limited to the present embodiment. In other embodiments, the angle θ between the first-end-side straight line Lb and the second-end-side straight line Lc may be smaller than 30 degrees or may be larger than 90 degrees.

Further, in some embodiments, as shown in FIGS. 5A to 6, the flexible support portion 4 includes a plurality of wave-shaped plate spring parts 45 including an elementary wave-shaped plate spring part 46 folded in a wave shape along the radial direction and disposed in the clearance S formed between the outer ring portion 2 and the inner ring portion 3. In the embodiment shown in FIGS. 5A to 6, as described above, the outer ring portion 2 is supported to the wheel-side housing 6h, and one radial end of each of the wave-shaped plate spring parts 45 is connected to the outer ring portion 2 and thereby is supported to the outer ring portion 2; and the other radial end is connected to the inner ring portion 3 and thereby supports the inner ring portion 3.

More specifically, as shown in FIGS. 5A and 5B, an interwave clearance S4 is formed on an inner side of the fold (side with smaller angle) in the folded wave-shaped structure of the wave-shaped plate spring part 45 (elementary wave-shaped plate spring part 46). In other words, with the interwave clearance S4 formed by the wave-shaped spring structure, the stiffness of the wave-shaped plate spring part 45 connecting the outer ring portion 2 and the inner ring portion 3 is decreased, whereby the wave-shaped plate spring part 45 is configured to be elastically deformable. Further, each of the wave-shaped plate spring parts 45 is elastically displaced in the radial direction or the axial direction in response to vibration from the outer ring portion 2 toward the inner ring portion 3 or vibration from the inner ring portion 3 toward the outer ring portion 2 to damp (reduce) vibration by using the interwave clearance S4, thus enabling insulation of vibration.

With the above configuration, the elastic deformable flexible support portion 4 can be formed by the plurality of wave-shaped plate spring parts 45 including the elementary wave-shaped plate spring part 46 of wave shape connecting the outer ring portion 2 and the inner ring portion 3. Although this structure is complicated compared with the above-described embodiment in which the flexible support portion 4 has the annular plate spring part 41, it is possible to provide the vibration insulator 1 with more improved vibration insulation property and durability to the pressing force (clamping force) in the axial direction.

In the above-described embodiment, in some embodiments, as shown in FIG. 5A, the wave-shaped plate spring parts 45 may be arranged at equal intervals along the circumferential direction in the clearance S formed between the outer ring portion 2 and the inner ring portion 3. In other words, one of the wave-shaped plate spring parts 35 and other two of the wave-shaped plate spring parts 35 on both sides are arranged at a predetermined distance. In the embodiments shown in FIGS. 5A to 5B, the number of the wave-shaped plate spring parts 45 is four, and the four wave-shaped plate spring parts 45 are arranged at equal intervals (i.e., at 90 degrees) in a state separated from each other around the outer ring portion 2 and the inner ring portion 3. The provision of the four wave-shaped plate spring parts 45 at intervals of 90 degrees ensures durability to the vibration transmitted toward the wave-shaped plate spring parts 45 from the entire circumstance of the annular outer ring portion 2 or the entire circumstance of the inner ring portion 3. However, the present invention is not limited to the present embodiment, and the number of the wave-shaped plate spring parts 45 may be any number that is two or more, for instance, three or five or more.

The number of the wave-shaped plate spring parts 45 may be determined in accordance with the magnitude of vibration or the pressing force in the axial direction of the vibration insulator 1.

As described above, as the wheel-side housing 6h is pressed to the bearing housing 52 in the axial direction, the pressing force is applied to each of the wave-shaped plate spring parts 45; the above-described arrangement of the wave-shaped plate spring parts 45 at equal intervals allows this pressing force in the axial direction to be uniformly distributed over each of the wave-shaped plate spring parts 45. Thereby, each of the wave-shaped plate spring parts 45 can flexibly elastically deform in the axial direction or the radial direction in response to vibration transmitted to the wave-shaped plate spring parts 45, compared with a case where the wave-shaped plate spring parts 45 are not arranged at equal intervals. Thus, it is possible to more effectively insulate vibration.

With the above configuration, since the wave-shaped plate spring parts 45 are arranged at equal intervals, it is possible to uniformly distribute the pressing force applied in the axial direction over the wave-shaped plate spring parts 45. Thus, it is possible to prevent the pressing force being concentrated on a part of the wave-shaped plate spring parts 45, and it is possible to provide the vibration insulator 1 which enables appropriate vibration insulation with respect to vibration transmitted to each of the wave-shaped plate spring parts 45 while ensuring an appropriate durability of the vibration insulator 1.

Here, the present inventors found that, in a limited space (clearance S) formed between the outer ring portion 2 and the inner ring portion 3, for instance, the more the wave-shaped spring structures (elementary wave-shaped plate spring part 46) arranged at equal intervals and the more the wave-shaped folds in the wave-shaped spring structures, the greater the durability to the pressing force and the vibration insulation property in the support state, through mathematical analysis. However, for instance, if the number of the wave-shaped plate spring parts 45 arranged at equal intervals is too much, the clearance S between the outer ring portion 2 and the inner ring portion 3 decreases, which can reduce the flexibility of the flexible support portion 4.

In view of this, in the above-described embodiment, in some embodiments, as shown in FIGS. 5A and 5B, each of the wave-shaped plate spring parts 45 may have a plurality of elementary wave-shaped plate spring parts 46 which are adjacent to each other. That is, in this embodiment, instead of increasing the number of the wave-shaped plate spring parts 45, each of the wave-shaped plate spring parts 45 includes a plurality of elementary wave-shaped plate spring parts 46 so as to increase the wave-shaped spring structures. In this case, as shown in FIG. 5A, a distance along the circumferential direction between the adjacent elementary wave-shaped plate spring parts 46 disposed in each of the wave-shaped plate spring parts 45 is smaller than a distance along the circumferential direction between adjacent two of the wave-shaped plate spring parts 45. The number of the elementary wave-shaped plate spring parts 46 may be determined in accordance with the magnitude of vibration or the pressing force in the axial direction of the vibration insulator 1.

For instance, in some embodiments, as shown in FIGS. 5A and 5B, the number of the wave-shaped plate spring parts 45 may be four, and the number of the elementary wave-shaped plate spring parts 46 may be two. That is, in the embodiment shown in FIGS. 5A and 5B, each of the wave-shaped plate spring parts 45 includes two adjacent elementary wave-shaped plate spring parts 46. Thus, the flexible support portion 4 has eight wave-shaped spring structures in total, and the number of the wave-shaped spring structures (elementary wave-shaped plate spring parts 46) is twice as much as a case where each of the wave-shaped plate spring parts 45 has a single elementary wave-shaped plate spring part 46. However, the present invention is not limited to the present embodiment. In other embodiments, each of the wave-shaped plate spring parts 45 may have two or more elementary wave-shaped plate spring parts 46. That is, let "n" be the number of the wave-shaped plate spring parts 45, and "m" be the number of the elementary wave-shaped plate spring parts 46, mxn number of wave-shaped spring structures may be provided.

With the above configuration, since each of the wave-shaped plate spring parts 45 includes a plurality of elementary wave-shaped plate spring parts 46, more wave-shaped spring structures can be formed in the limited clearance S formed between the outer ring portion 2 and the inner ring portion 3. Thus, it is possible to improve the insulation performance and appropriate durability to the pressing force of the vibration insulator 1.

Further, in other embodiments, as shown in FIGS. 5A and 5B, the number of the elementary wave-shaped plate spring parts 46 may be two, and the two elementary wave-shaped plate spring parts 46 (46*a*, 46*b*) may be arranged in a line symmetric manner in the radial direction. More specifically, as shown in FIG. 5B, a first elementary wave-shaped plate spring part 46*a* and a second elementary wave-shaped plate spring part 46*b* are line-symmetric with respect to a symmetric axis Ld running between the first elementary wave-shaped plate spring part 46*a* and the second elementary wave-shaped plate spring part 46*b* along the radial direction. In this way, when two elementary wave-shaped plate spring parts 16 are line-symmetrically arranged, it is possible to increase the maximum length W of the interwave clearance S4 in the circumferential direction, compared with non-symmetric spring parts, and thus it is possible to improve the vibration insulation property. In the embodiment shown in FIGS. 5A and 5B, the elementary wave-shaped plate spring parts 46 (46*a*, 46*b*) satisfy W2=W1×2+W3, where W1 represents the length in the circumferential direction of the interwave clearance S4 formed on the inner side of the fold, W2 represents the maximum interwave clearance S4 formed by the two line-symmetric elementary wave-shaped plate spring parts 46, and W3 represents a clearance between the two elementary wave-shaped plate spring parts 46. By the two line-symmetric elementary wave-shaped plate spring parts 46, the maximum length of the interwave clearance S4 in the circumferential direction is increased (W2>W1).

With the above configuration, since the two elementary wave-shaped plate spring parts 46 (first elementary wave-shaped plate spring part 46*a* and second elementary wave-shaped plate spring part 46*b*) extending in the radial direction are arranged in a line-symmetric manner in the radial direction, it is possible to provide the vibration insulator 1 which enables appropriate vibration insulation.

Further, in some embodiments, as shown in FIGS. 5A and 5B, the elementary wave-shaped plate spring parts 46 includes a plurality of circumferential plate parts 47, a plurality of first-end-side coupling plate parts 48, and a plurality of second-end-side coupling plate parts 49.

The circumferential plate parts 47 is a portion of the elementary wave-shaped plate spring part 46 extending in the circumferential direction. The elementary wave-shaped plate spring part 46 includes a plurality of circumferential plate parts 47, and the circumferential plate parts 47 are separated from each other in the radial direction.

Meanwhile, the first-end-side coupling plate part 48 and the second-end-side coupling plate part 49 are portions of the elementary wave-shaped plate spring part 46 connecting the circumferential plate parts 47, which are separated from each other in the radial direction. Every two of the circumferential plate parts 47 are connected via the first-end-side coupling plate part 48 or the second-end-side coupling plate part 49 so as to form the wave-shaped structure as a whole.

For instance, assuming that the third circumferential plate part 47*c* from the outer ring portion 2 is the middle of a series of three circumferential plate parts 47 (47*b*, 47*c*, 47*d*), the third circumferential plate part 47*c* is adjacent to the second circumferential plate part 47*b* on the outer ring portion 2 side in the radial direction and is adjacent to the fourth circumferential plate part 47*d* on the inner ring portion 3 side in the radial direction. Then, a first end (on the left side in the figure) of the third circumferential plate part 47*c* and a first end (on the same side) of the second circumferential plate part 47*b* are connected to each other via the first first-end-side coupling plate part 48*a* which extends in the radial direction. Meanwhile, a second end (on the right side in the figure) of the third circumferential plate part 47*c* and a second end (on the same side) of the fourth circumferential plate part 47*d* are connected to each other via the second second-end-side coupling plate part 49*b* which extends in the radial direction. Similarly, for instance, assuming that the fourth circumferential plate part 47*d* is relatively in the middle, as described above, the second end (on the right side in the figure) of the fourth circumferential plate part 47*d* is connected to the second side of the third circumferential plate part 47*c* via the second second-end-side coupling plate part 49*b*, and a first end (on the left side in the figure) thereof is connected to a first end on the same side (left in the figure) of the fifth circumferential plate part 47*e* via the second first-end-side coupling plate part 48*b*. Repeating this pattern forms the wave-shaped spring structure.

For instance, in some embodiments, as shown in FIGS. 5A and 5B, the number of the circumferential plate parts 47 may be an odd number of three or more. When the number of the circumferential plate parts 47 is odd, the two line-symmetric elementary wave-shaped plate spring parts 46 are connected to the outer ring portion 2 via a single joint part 4*a* and is connected to the inner ring portion 3 via two joint parts 4*b* each contiguous to one of the elementary wave-shaped plate spring parts 46.

With the above configuration, it is possible to provide the vibration insulator 1 having appropriate durability to the pressing force and vibration insulation property. Further, when the number of the circumferential plate parts 47 is odd, the numbers of the first-end-side coupling plate part 48 and the second-end-side coupling plate part 49 are the same. Thus, it is possible to equalize the elasticity on the first end side and the elasticity on the second end side in the circumferential plate part 47.

The wave-shaped folds may be formed in a zigzag shape by directly connecting end portions of the plurality of circumferential plate parts 47. In other words, in this case, the first-end-side coupling plate part 48 and the second-end-side coupling plate part 49 are formed by plate thickness of the plurality of circumferential plate parts 47.

Next, a sealing member 64 used for mounting the vibration insulator 1 on the unbalance detection device 6 will be described.

In some embodiments, as shown in FIGS. 4 and 6, the wheel-side contact surface 2*fw* of the outer ring portion 2 is configured to come into contact with a sealing member 64 for preventing air inside the wheel-side housing 6*h* from leaking via the clearance S formed between the outer ring portion 2 and the inner ring portion 3. The sealing member 64 forms a part of the wheel-side housing 6*h*, and in the embodiments shown in FIGS. 3 to 6, is attached to the body of the wheel-side housing 6*h* with the bolt 67. More specifically, in a state where the wheel-side contact surface 2*fw* of the outer ring portion 2 is in contact with a surface of the sealing member 64 on the cartridge side Dc in the axial direction, and a surface of the sealing member 64 on the wheel side Dw in the axial direction is in contact with a surface of the body of the wheel-side housing 6*h*, the sealing member 64 is fixed with the bolt 67 penetrating these members in the axial direction. Further, with this configuration, the sealing member 64 (described later) is fixed to the wheel-side housing 6*h* together with the flange part 15 of the outer ring portion 2.

The role of the sealing member 64 will be described. As described above, the vibration insulator 1 has the clearance S, formed between the outer ring portion 2 and the inner ring portion 3, the outer clearance S1, the inner clearance S2, and the interwave clearance S4. Via these clearances, both sides (wheel side Dw and cartridge side Dc) of the vibration insulator 1 communicate with each other. Accordingly, when the cartridge 5 is supported to the wheel-side housing 6*h* via the vibration insulator 1, the wheel side Dw and the cartridge side Dc of the vibration insulator 1 communicate with each other via the clearance S of the vibration insulator 1. Therefore, if air (rotation air) is supplied into the wheel-side housing 6*h* to rotate the wheel for the unbalance detection work, the rotational air flows to the outside via the clearance S or the like, which makes appropriate work difficult. For this reason, as shown in FIGS. 4 and 6, the sealing member 64 is disposed on the wheel side Dw of the outer ring portion 2, inner ring portion 3, and the flexible support portion 4.

Additionally, the sealing member 64 has an annular shape. In the embodiments shown in FIGS. 4 and 6, the sealing member 64 has an annular shape in conformance with the vibration insulator 1 and is disposed on the wheel-side housing 6*h* side as described above. Further, a first seal rubber 66*a* is disposed on an inner circumferential surface of the annular sealing member 64 on the cartridge side Dc in the axial direction. The sealing member 64 is connected to the inner ring portion 3 via the first seal rubber 66*a*. This prevents the air inside the wheel-side housing 6*h* from flowing to the outside from between the sealing member 64 and the inner ring portion 3. Meanwhile, a second seal rubber 66*b* is disposed on an outer circumferential surface of the sealing member 64 on the wheel side Dw in the axial direction. The sealing member 64 is connected to the wheel-side housing 6*h* via the second seal rubber 66*b*. This prevents the air inside the wheel-side housing 6*h* from flowing to the outside from between the sealing member 64 and the wheel-side housing 6*h*.

In the embodiments shown in FIGS. 4 and 6, an annular (circular ring-shaped) back plate 65 is disposed in a central space of the annular sealing member 64 and is in contact with the sealing member 64 and the first seal rubber 66*a* on the inner circumferential side of the sealing member 64. Thus, an opening on the cartridge side Dc in the axial direction of the wheel-side housing 6*h* having the sealing member 64 is closed by the back plate 65, the insertion part 52*i*, the inner ring portion 3, and the first seal rubber 66*a*, whereby the air inside the wheel-side housing 6*h* is prevented from flowing out.

With the above configuration, even when the vibration insulator 1 has the clearance S formed between the outer ring portion 2 and the inner ring portion 3, the sealing member 64 prevents the air inside the wheel-side housing 6*h* from flowing to the outside via the clearance S. Thus, during the unbalance detection work of the rotor 51 of the cartridge 5, the rotation air supplied into the wheel-side housing 6*h* to rotate the rotor 51 inside the wheel-side housing 6*h* is prevented from flowing to the outside via the clearance S. Consequently, the unbalance detection work can be appropriately performed.

Hereinafter, embodiments in which a gap G is formed between the sealing member 64 and each of the inner ring portion 3 and the flexible support portion 4 in the above-described embodiments will be described with reference to FIGS. 4 and 6.

In some embodiments, as shown in FIGS. 4 and 6, in a state where the wheel-side housing 6*h* is pressed to the bearing housing 52 in the axial direction (support state), a gap G may be formed between the inner ring portion 3 and the sealing member 64 and between the flexible support portion 4 and the sealing member 64 each. In other words, in the support state, the sealing member 64 separates from the inner ring portion 3 at a distance h1, and the sealing member 64 separates from the flexible support portion 4 at a distance h2. Thus, the sealing member 64 and the inner ring portion 3, as well as the sealing member 64 and the flexible support portion 4, are not in direct contact. The gap G prevents contact between the flexible support portion 4 or the inner ring portion and the sealing member 64 when the flexible support portion 4 or the inner ring portion 3 is significantly displaced relative to the outer ring portion 2 due to vibration. The distance h1 and the distance h2 may be the same (h1=h2), or may be different (h1≠A2).

With the above configuration, the gaps G formed between the sealing member 64 and the inner ring portion 3 and between the sealing member 64 and the flexible support portion 4 prevent direct contact between the sealing member 64 and the inner ring portion 3 or the flexible support portion 4 subjected to elastic deformation due to vibration or the like, thus enabling appropriate vibration insulation. Further, with this configuration, it is possible to prevent breakage of the vibration insulator 1 or the sealing member 64 and ensure the durability of the vibration insulator 1.

In some embodiments, as shown in FIGS. 4 and 6, the wheel-side contact surface 2*fw* of the outer ring portion 2 is configured to be located on the wheel side Dw in the radial direction relative to the inner ring portion 3 and the flexible support portion 4, in a state where the wheel-side housing 6*h* is not pressed to the bearing housing 52 in the axial direction yet (i.e., initial state). That is, in the initial state, the wheel-side contact surface 2*fw* of the outer ring portion 2 protrudes from an end surface on the same side (wheel-side end surface 3*fw*) of the inner ring portion 3 toward the wheel side Dw. Thus, a distance between the wheel-side contact surface 2*fw* of the outer ring portion 2 and the wheel-side end surface 3*fw* of the inner ring portion 3 is equal to or more than the distance h2. Thus, even if the inner ring portion 3 and the flexible support portion 4 are displaced in the axial direction due to the pressing force in the support state, the gap G is formed between the inner ring portion 3 and the sealing member 64 and between the flexible support portion 4 and the sealing member 64.

With the above configuration, the vibration insulator 1 can prevent a situation where an end portion (wheel-side end surface 3*wf*) of the inner ring portion 3 opposite to the bearing-side contact surface 3*fb* physically interferes with the wheel-side housing 6*h* side such as the sealing member 64, when the wheel-side housing 6*h* is pressed to the bearing housing 52 in the axial direction, and thereby the inner ring portion 3 in contact with the bearing housing 52 side is pressed to the wheel-side housing 6*h*. That is, the gap G can be formed in the support state.

At this time, in some embodiments, as shown in FIGS. 4 and 6, the bearing-side contact surface 3*fb* of the inner ring portion 3 may be located on the cartridge side Dc in the radial direction relative to the outer ring portion 2 and the flexible support portion 4, in a state where the wheel-side housing 6h is not pressed to the bearing housing 52 in the axial direction yet (i.e., initial state). More specifically, as shown in FIGS. 4 and 6, in the initial state, the bearing-side contact surface 3fb of the inner ring portion 3 protrudes from an end surface on the same side (bearing-side end surface 2fb) of the outer ring portion 2 toward the cartridge side Dc. Thus, a distance between the bearing-side contact surface 3fb of the inner ring portion 3 and the bearing-side end surface 2fb of the outer ring portion 2 is a distance h3. Further, the length L1 of the inner ring portion 3 in the axial direction is shorter than a length obtained by adding the length L2 of the outer ring portion 2 in the axial direction and the distance h3 in the axial direction (L1+h3<L2). Thus, even if the inner ring portion 3 and the flexible support portion 4 are displaced in the axial direction due to the pressing force in the support state, the gap G is formed between the inner ring portion 3 and the sealing member 64 and between the flexible support portion 4 and the sealing member 64.

With the above configuration, the vibration insulator 1 can prevent a situation where an end portion of the inner ring portion 3 opposite to the bearing-side contact surface 3fb physically interferes with the wheel-side housing 6h, when the wheel-side housing 6h is pressed to the bearing housing 52 in the axial direction, and thereby the inner ring portion 3 in contact with the bearing housing 52 side is pressed to the wheel-side housing 6h.

REFERENCE SIGNS LIST

1 Vibration insulator
15 Flange part of vibration insulator
2 Outer ring portion
2fb Bearing-side end surface
2fw Wheel-side contact surface
3fb Bearing-side contact surface
3 Inner ring portion
3fw Wheel-side end surface
3s Central space
4 Flexible support portion
4a Joint part with outer ring portion
4b Joint part with inner ring portion
41 Annular plate spring part
42 Outer-ring-side joint part
43 Inner-ring-side joint part
45 Wave-shaped plate spring part
46 Elementary wave-shaped plate spring part
46a First elementary wave-shaped plate spring part
46b Second elementary wave-shaped plate spring part
47 Circumferential plate part
48 First-end-side coupling plate part
48a First first-end-side coupling plate part
48b Second first-end-side coupling plate part
49 Second-end-side coupling plate part
49a First second-end-side coupling plate part
49b Second second-end-side coupling plate part
5 Cartridge
51 Rotor
51r Rotational shaft
52 Bearing housing
52b Bearing
52i Insertion part
52f Flange part of bearing housing
53 Turbine wheel
54 Compressor wheel
57 Oil supply port
6 Unbalance detection device
6c Compressor-side housing member
6h Wheel-side housing
6t Turbine-side housing member
61 Compressor-side support mechanism
62 Turbine-side support mechanism
64 Sealing member
65 Back plate
66a First seal rubber
66b Second seal rubber
67 Bolt
71 Pressing device
72 Pressing rod
73 Piston device
74 Coupling member
75 Air supply pipe
76 Blower
77 Oil supply pipe
78 Support arm
8 Device-side vibration insulator
9 Vibration sensor
O Center
S Clearance
S1 Outer clearance
S2 Inner clearance
S4 Interwave clearance
W Length of inter wave clearance in axial direction
La First straight line
Lb First-side straight line
Lc Second-side straight line
Ld Symmetric axis
G Gap
h Distance in axial direction
h1 Distance between sealing member and inner ring portion
h2 Distance between sealing member and flexible support portion
L1 Length of inner ring portion in axial direction
L2 Length of outer ring portion in axial direction
Dc Cartridge side (axial direction)
Dw Wheel side (axial direction)

The invention claimed is:

1. A vibration insulator mounted between a cartridge and a wheel-side housing, the cartridge including: a rotor having a wheel and a rotational shaft; and a bearing housing accommodating a bearing rotatably supporting the rotor, the wheel-side housing being to be pressed to the bearing housing in an axial direction, the vibration insulator comprising:

an annular outer ring portion having a wheel-side contact surface configured to come into contact with the wheel-side housing;

an annular inner ring portion disposed inside the outer ring portion with a clearance from the outer ring portion and having a bearing-side contact surface configured to come into contact with the bearing housing; and a flexible support portion interposed between the outer ring portion and the inner ring portion and connecting the outer ring portion and the inner ring portion, the flexible support portion being elastically deformable, wherein the flexible support portion includes:

an annular plate spring part having an annular shape and disposed in the clearance;

an outer-ring-side joint part connecting the outer ring portion and a part of the annular plate spring; and an inner-ring-side joint part connecting the inner ring portion and a part of the annular plate spring part at a portion different in a circumferential direction from a portion where the outer-ring-side joint part is connected to the annular plate spring part.

2. The vibration insulator according to claim 1, wherein the outer-ring-side joint part and the inner-ring-side joint part are located on a same first straight line passing through a central line of the inner ring portion.

3. The vibration insulator according to claim 1, wherein an angle between a first-end-side straight line passing through a center of the inner ring portion and a first end of the inner-ring-side joint part in the circumferential direction and a second-end-side straight line passing through the center of the inner ring portion and a second end of the inner-ring-side joint part in the circumferential direction is 30 degrees or more and 90 degrees or less.

4. The vibration insulator according to claim 1, wherein each of the outer ring portion, the inner ring portion, and the flexible support portion is made of a metal.

5. A vibration insulator mounted between a cartridge and a wheel-side housing, the cartridge including: a rotor having a wheel and a rotational shaft, and a bearing housing accommodating a bearing rotatably supporting the rotor, the wheel-side housing being to be pressed to the bearing housing in an axial direction, the vibration insulator comprising:
an annular outer ring portion having a wheel-side contact surface configured to come into contact with the wheel-side housing;
an annular inner ring portion disposed inside the outer ring portion with a clearance from the outer ring portion and having a bearing-side contact surface configured to come into contact with the bearing housing; and
a flexible support portion interposed between the outer ring portion and the inner ring portion and connecting the outer ring portion and the inner ring portion, the flexible support portion being elastically deformable,
wherein the wheel-side contact surface of the outer ring portion is configured to come into contact with a sealing member for preventing air inside the wheel-side housing from flowing out via the clearance.

6. The vibration insulator according to claim 5, wherein the flexible support portion includes a plurality of wave-shaped plate spring parts disposed in the clearance and including an elementary wave-shaped plate spring part folded in a wave shape along a radial direction.

7. The vibration insulator according to claim 6, wherein the wave-shaped plate spring parts are arranged at equal intervals along a circumferential direction in the clearance.

8. The vibration insulator according to claim 6, wherein each of the wave-shaped plate spring parts has a plurality of elementary wave-shaped plate spring parts.

9. The vibration insulator according to claim 8, wherein the number of the wave-shaped plate spring parts is four, and
wherein the number of the elementary wave-shaped plate spring parts is two.

10. The vibration insulator according to claim 8, wherein the number of the elementary wave-shaped plate spring parts is two, and
wherein the two elementary wave-shaped plate spring parts are arranged in a line-symmetric manner in the radial direction.

11. The vibration insulator according to claim 8, wherein each elementary wave-shaped plate spring part includes:
a plurality of circumferential plate parts separated from each other in the radial direction and each extending in a circumferential direction;
a plurality of first-end-side coupling plate parts each connecting first ends of adjacent two of the circumferential plate parts on a first side in the radial direction, along the radial direction; and
a plurality of second-end-side coupling plate parts each connecting second ends of adjacent two of the circumferential plate parts on a second side in the radial direction, along the radial direction.

12. The vibration insulator according to claim 11, wherein the number of the circumferential plate parts is an odd number of 3 or more.

13. The vibration insulator according to claim 5, wherein a gap is formed between the inner ring portion and the sealing member and between the flexible support portion and the sealing member, in a state where the wheel-side hosing is pressed to the bearing housing in the axial direction.

14. The vibration insulator according to claim 5, wherein each of the outer ring portion, the inner ring portion, and the flexible support portion is made of a metal.

15. A vibration insulator mounted between a cartridge and a wheel-side housing, the cartridge including: a rotor having a wheel and a rotational shaft, and a bearing housing accommodating a bearing rotatably supporting the rotor, the wheel-side housing being to be pressed to the bearing housing in an axial direction, the vibration insulator comprising:
an annular outer ring portion having a wheel-side contact surface configured to come into contact with the wheel-side housing;
an annular inner ring portion disposed inside the outer ring portion with a clearance from the outer ring portion and having a bearing-side contact surface configured to come into contact with the bearing housing; and
a flexible support portion interposed between the outer ring portion and the inner ring portion and connecting the outer ring portion and the inner ring portion, the flexible support portion being elastically deformable,
wherein the wheel-side contact surface of the outer ring portion is located on a wheel side in the axial direction relative to the inner ring portion and the flexible support portion in a state where the wheel-side hosing is not pressed to the bearing housing in the axial direction.

16. The vibration insulator according to claim 15, wherein the bearing-side contact surface of the inner ring portion is located on a cartridge side in the axial direction relative to the outer ring portion and the flexible support portion in a state where the wheel-side hosing is not pressed to the bearing housing in the axial direction.

17. The vibration insulator according to claim 15, wherein the flexible support portion includes a plurality of wave-shaped plate spring parts disposed in the clearance and including an elementary wave-shaped plate sprint part folded in a wave shape along a radial direction.

18. The vibration insulator according to claim 15, wherein each of the outer ring portion, the inner ring portion, and the flexible support portion is made of a metal.

19. An unbalance detection device for detecting unbalance of a rotor of a cartridge including: the rotor having a wheel and a rotational shaft; and a bearing housing accommodating a bearing rotatably supporting the rotor; the unbalance detection device comprising:

a wheel-side housing member accommodating the wheel;

a support mechanism pressing the wheel-side housing member to the bearing housing to support the cartridge;

a vibration sensor capable of detecting vibration upon rotation of the rotor; and a vibration insulator between mounted between the wheel-side housing member and the bearing housing, wherein the vibration insulator comprising:

an annular outer ring portion having a wheel-side contact surface configured to come into contact with the wheel-side housing, an annular inner ring portion disposed inside the outer ring portion with a clearance from the outer ring portion and having a bearing-side contact surface configured to come into contact with the bearing housing; and a flexible support portion interposed between the outer ring portion and the inner ring portion and connecting the outer ring portion and the inner ring portion, the flexible support portion being elastically deformable.

* * * * *